(12) United States Patent
Babcock et al.

(10) Patent No.: US 7,954,712 B2
(45) Date of Patent: Jun. 7, 2011

(54) PRODUCT, ASSET, AND DEVICE TRACKING, IDENTIFICATION, AND PRICING SYSTEM

(75) Inventors: William J. Babcock, Bentonville, AR (US); Steven E. Niles, Dallas, TX (US); Bruce K. Babcock, San Antonio, TX (US)

(73) Assignee: Transparent Visibility Holdings, LLC, Bentonville, AR (US)

( * ) Notice: Subject to any disclaimer, the term of this patent is extended or adjusted under 35 U.S.C. 154(b) by 357 days.

(21) Appl. No.: 12/210,179

(22) Filed: Sep. 12, 2008

(65) Prior Publication Data

US 2010/0065632 A1    Mar. 18, 2010

(51) Int. Cl.
  *G06F 19/00* (2006.01)
  *G06Q 30/00* (2006.01)
  *G06Q 90/00* (2006.01)

(52) U.S. Cl. ........................ 235/385; 235/375

(58) Field of Classification Search .................. 235/385, 235/375, 487, 462.46, 472.02
See application file for complete search history.

(56) References Cited

U.S. PATENT DOCUMENTS

| | | | |
|---|---|---|---|
| 4,002,886 A | 1/1977 | Sundelin | |
| 4,521,677 A | 6/1985 | Sarwin | |
| 4,821,291 A | 4/1989 | Stevens et al. | |
| 4,973,952 A | 11/1990 | Malec et al. | |
| 5,723,204 A | 3/1998 | Stefik | |
| 5,995,015 A | 11/1999 | DeTemple et al. | |
| 6,089,453 A | 7/2000 | Kayser et al. | |
| 6,094,642 A | 7/2000 | Stephenson et al. | |
| 6,313,745 B1 | 11/2001 | Suzuki | |
| 6,348,908 B1 | 2/2002 | Richley et al. | |
| 6,427,922 B1 | 8/2002 | Marchand | |
| 6,486,861 B1 | 11/2002 | Preas et al. | |
| 6,547,140 B2 | 4/2003 | Marchand | |
| 6,573,880 B1 | 6/2003 | Simoni et al. | |
| 6,588,131 B2 | 7/2003 | O'Connell, Jr. | |
| 6,753,830 B2 | 6/2004 | Gelbman | |

(Continued)

FOREIGN PATENT DOCUMENTS

WO    WO/2006/087424    8/2006

OTHER PUBLICATIONS

Bill C. Hardgrave, David B. Cromhout, and Deborah J. Armstrong, "Item-Level RFID: Future Direction—Current Status, RFID Item-Level Tagging for Apparel/Footwear: Feasibility Study," Information Technology Research Institute Working Paper Series, Jun. 5, 2008, Sam M. Walton College of Business, Fayetteville, Arkansas.

*Primary Examiner* — Edwyn Labaze
(74) *Attorney, Agent, or Firm* — Kilpatrick Townsend & Stockton LLP

(57) ABSTRACT

The invention utilizes a system that links two-way communication components with inventory, fixtures, and people. Once linked, the system permits a centralized computer network to collect information about the spatial and temporal relationship between inventory, fixtures, and people using a low frequency communication protocol. When the invention is applied to a retail situation, the retailer can track inventory throughout the supply chain and can do so without substantial human involvement. Furthermore, the two-way communication components also permit the retailer to communicate directly with products on the shelves in a way that allows for re-pricing of goods or broadcasting of messages to customers, also without the need for direct human involvement.

20 Claims, 14 Drawing Sheets

U.S. PATENT DOCUMENTS

| | | |
|---|---|---|
| 6,885,032 B2 | 4/2005 | Forbes et al. |
| 6,924,781 B1 | 8/2005 | Gelbman |
| 6,972,682 B2 | 12/2005 | Lareau et al. |
| 7,028,339 B2 | 4/2006 | Stevens |
| 7,049,963 B2 | 5/2006 | Waterhouse et al. |
| 7,090,125 B2 | 8/2006 | Goel et al. |
| 7,164,359 B2 | 1/2007 | Waterhouse et al. |
| 7,170,413 B1 | 1/2007 | Waterhouse et al. |
| 7,242,290 B2 | 7/2007 | Stevens |
| 7,242,301 B2 | 7/2007 | August et al. |
| 2005/0199716 A1* | 9/2005 | Shafer et al. ............ 235/385 |
| 2006/0047464 A1* | 3/2006 | Kumar et al. ............ 702/122 |
| 2008/0129456 A1* | 6/2008 | Stevens et al. ............ 340/10.1 |
| 2008/0231449 A1* | 9/2008 | Moshfeghi ............ 340/572.1 |

* cited by examiner

PRODUCT, ASSET, AND DEVICE TRACKING, IDENTIFICATION, AND PRICING SYSTEM

CROSS REFERENCES

None.

GOVERNMENTAL RIGHTS

None.

BACKGROUND OF THE INVENTION

The life cycle of a product is generally traceable using logistics. Supply chain logistics begin with the manufacturing of a product and generally govern the manner by which the product is made, sold, packaged, shipped, delivered, and inventoried under wholesale conditions. The supply chain continues at the retail level where individual retail locations store inventory for sale to the public.

Of the many variables affecting logistics, the variable most likely to cause interruptions within the supply chain is human error. Human error makes it very difficult to capture a true picture of the entire supply chain because every human error propagates throughout the supply chain. For instance, a mis-keyed order for a pallet of products may affect a retailer's ability to shelve products, while the same error may result in collections issues for the wholesaler's accounts receivable. There are innumerable examples of human error negatively impacting supply chain logistics. The result of each human error is that logistics data is increasingly difficult to find, sort, and verify. Even if data is readily available, human error renders such data unreliable. Data availability and reliability is affected until errors are located and repaired; however, locating the error requires additional data analysis at an expense that is often times unquantifiable. Because the marketplace strives for efficiency and exactitude, there has been an effort within industry to automate many tasks that are particularly susceptible to human error to save unnecessary costs associated with the supply chain. It is thus a primary object of the invention to reduce the amount of human error affecting supply chain data.

The opportunity for human error occurs at even the earliest point in the supply chain, which begins with the manufacture of the product. If a retailer's goal is to have an accurate and reliable system for placing orders and tracking inventory, then supply chain logistics constitute not simply inventory control within the retail store, but rather more preferably requires an analysis of an entire supply chain. Typically, manufacturers apply identifying information to products at a lot level, rather than an individual level. For example, a product may be manufactured and placed in a container bearing a UPC code, lot number, and sell by date. Collectively, these pieces of data yield information about a group of products, rather than individual products alone. Errors traceable to human intervention are compounded by the fact that many retail items are sold and shipped in large lots, thus rendering errors with respect to individual products virtually untraceable. It is thus an object of the invention to objectively assign an identity marker to an item in a manner that facilitates the location of individual product units. It is a further object of the invention to create a finer level of product visibility throughout the supply chain.

Another important facet of supply chain logistics is loss prevention, which occurs before and during a retailer's possession of inventory. Loss prevention, at its core, comprises a logistics system designed to identify goods that have been damaged, stolen, mishandled, misidentified, or misplaced. Loss prevention is important to retailers because profitability often turns upon the proper management of risk and inventory. For example, if a retail location allows all inventory to be stolen by its customers, then the retailer has done a poor job of managing its inventory. If a retail location allows its inventory to spoil due to improper refrigeration of time-sensitive product, then the retailer has done a poor job of managing its risk.

The first task of supply chain loss prevention involves awareness and acceptance of certain risks associated with upstream supply chain corruption associated with shipping and freight damage. Any damage represents a cost, and accurately assigning the responsibility for cost due to freight damage is important to retailers. It is important for retailers to not allow the cost of freight-damaged goods to be incurred by the retailer even before the item is placed on shelves. It is therefore an object of the invention to permit retailers and shipping companies to objectively identify the condition of an item during shipping.

Retailers in the prior art, when assessing the extent of damage caused by shipping, rely heavily upon visual inspection and subjective grading of the condition of the exterior of the container to make a decision on whether to accept the goods as delivered or to reject the goods and return them to the manufacturer. Visual inspection is not a reliable way to assess true damage because many items are packaged in brown boxes that may appear intact while the contents may be irreparably damaged. For example, when perishable food is destined for retail sale, a visual inspection of a perishable item typically cannot assess temperature variation or potential spoliation caused by delay or other compromise in the supply chain. Often times only the most substantial temperature variations will offer a visual cue, such as when frozen food is visibly thawed. Thus, visual inspection is not a reliable way to assess the true injury to shipped products also because the shipping container may be sealed and thus conceal the true extent of the damage. It is therefore an object of the invention to minimize the subjectivity associated with human visual inspection of goods at various points during any supply chain. It is also an object of the invention to allow for gathering of objective data associated with an item under a variety of shipping conditions, including temperature fluctuations, applied force, and duration of shipment.

There are additional problems with traditional supply chain logistics from the standpoint of upstream supply chain integrity. For example, when an item arrives at a retail location, the arrival of the item to the retail location is recorded most typically using manual entry of data, whether by keyed data entry, handheld scanner, or some other method of human-involved data entry. Human intervention, at this level, is a considerable source of error. For example, a human operator may mistakenly mis-key data and may overstate or understate the true quantity of the goods that are actually received by the retail facility. These errors are not self-canceling. Instead, an error of this nature alters the inventory and accounting system in a dramatic way because the assets of the retailer are misstated. It is therefore an object of the invention to minimize human involvement in the way that retail establishments receive shipped goods.

A second component of loss prevention is accounting for starting inventory in order to compare starting inventory with inventory that has been sold. Such accounting comparison of inventory sold against inventory kept on hand is made possible by subtracting the amount of product sold from the retailer's starting inventory. This calculation is performed in order to accurately assess the amount of loss due to theft or destruction of the item while on the shelf. In order to accomplish this routine task, the retailer must devote a substantial amount of employee time and labor resources to periodically audit the status of current inventory. A retailer's ability to properly quantify loss attributable to theft or destruction is difficult, costly, and time-consuming; as a result, the true extent to which the retailer is suffering theft or loss is generally not known until after substantial, non-recoverable losses have already occurred. Before the invention, this type of accounting and inventory analysis was an expensive cost of doing retail business. It is thus an object of the invention to allow a retailer to have a real-time understanding of existing inventory in a store without the need to use employees to manually count the number of items remaining on the shelves. The invention has a goal of minimizing or eliminating human error and involvement in establishing or maintaining current inventory.

A third component of loss prevention is the active monitoring against shoplifting and employee theft. This is generally accomplished by a combination of sophisticated surveillance equipment and loss prevention personnel. A comprehensive approach to preventing theft involves many different facets, yet none of the prior art establishes a continuous and streamlined approach to true inventory management. As one example of prior art, retailers have adopted technology that employs anti-theft markers as embedded within item packaging or affixed to the goods using fobs. These embedded markers, or tags, typically require human input on many levels, but the most illustrative demand for human intervention is the requirement that the checkout cashier deactivate the product marker at the check-out counter. While activation of the security system requires substantial human involvement, it is clear that deactivation is required to allow the item to be removed from the building without actuating an anti-theft deterrence alarm system. As testament to the strong prevalence of human error in the retail industry, most consumers have experienced for themselves situations where a retail clerk erred in failing to deactivate the anti-theft marker embedded within or affixed to a lawfully purchased item. The impression upon the consumer a negative one, meaning such common occurrence is counterproductive to the reasonable goals that a retailer has in striving to offer a reasonable and comfortable shopping experience to every consumer. This example carries a further drawback in that it does not prevent employee theft, as employees have access to the deactivation units. It is thus an object of the invention to minimize human involvement in connection with loss prevention.

There are additional human costs associated with theft prevention, including those costs associated with hiring personnel for the express purpose of actively monitoring customers and employees to guard against theft. While the hourly or salaried costs are identifiable, they are nonetheless an expense to the business. Further, there are hidden costs and expenses retailers ultimately must bear, including litigation costs associated with overzealous loss prevention personnel. Further, where loss prevention personnel are strident and prevalent, the level of consumer satisfaction is lowered. It is thus an object of the invention to minimize human involvement while actively guarding against theft by monitoring customers and employees. It is a further object of the invention to implement a more silent, less intrusive system of inventory monitoring than those found in the prior art.

The component of the supply chain immediately downstream from loss prevention is how best to market and sell goods to consumers. Retail marketing, at its core, involves the display of individual items. In most retail settings, goods are strategically positioned throughout a retailer's store. The retailer may provide a flyer listing sales to the customer, while in-store displays or placards may attempt to draw consumers' attention to a particular product. Such a marketing strategy represents a one-size-fits-all approach to every consumer, even though retailers may possess valuable purchasing history relative to individual consumers obtained through loyalty programs or other purchase records. Furthermore, such in-store advertising does not recommend complimentary products based upon the contents of a customer's shopping basket or cart. It is an object of the invention to provide targeted in-store advertising based upon a customer's prior purchasing history and/or upon complimentary items in a customer's possession in the store.

In addition to the physical presence of goods, pricing is a primary component of any display of retail items. In many retail settings, the pricing of an item is displayed to a potential customer using any number of different methods, including adhesive labels, hanging fobs, shelf labels, or point-of-purchase display placards. In the event a retailer desires to increase or decrease the price of a given item in immediate response to changes in pricing factors, the potential increase in profits attributable to the price change must clearly outweigh the inherent labor costs associated with manually changing the pricing displays associated with the product. That is, it does not make sense for a retailer to make only a slight adjustment in price, even though doing so could marginally boost sales because the retailer would have to incur the labor expense attributable to physically changing price displays. Further, the process of manually changing prices is inefficient, as a price change requires an expense of materials required to re-price items already placed on the shelves. All of these hidden costs decrease the retailer's profitability and factor into any choice to increase or decrease the retail price of an item. It is thus an object of the invention to allow retailers to make adjustments in pricing for retail goods without incurring the substantial cost of labor and materials to do so. It is also an object of the invention to permit retailers to save money on training employees for tasks that are no longer necessary.

There are also other problems associated with re-pricing existing items on the retail shelves. Regardless of the employee time cost, human error may further defeat profitability because each opportunity for human intervention in a retail situation comes with inherent risk of error such as mislabeling, miscounting, or misplacement. It is thus an object of the invention to provide a manner by which the pricing structure on a given item may be modified from a one location, even from a centralized home office location, without the requirement of direct human contact at an item-by-item level.

Item-level re-pricing is also something that retailers have not yet before been able to realize without significant human involvement. For example, oftentimes a retailer will discontinue a line of goods and reduce the price significantly in order to motivate customers to buy the item, thus allowing the retailer to recapture at least some of the retailer's initial investment in the goods. In order to do so, the retailer must send an employee to locate the discontinued item and either re-price the items individually using the current location or, alternatively, remove all remaining items and place them in an area of the store that is devoted to clearance-priced inventory. Discontinued goods thus cost the retailer not only in decreased sale price but also in added human cost of retrieving and monitoring shelves for clearance or out-of-date items. It is thus an object of the invention to permit retailers to conduct item-level pricing, including item-level clearance pricing, without substantial human involvement.

Furthermore, as retailers are increasingly relying upon computerized retail point of sale systems, any price change for a product which is associated with a traditional UPC bar code must also be changed in the retailer's pricing database or computer system. Thus, as a regular function of even a slight price change, a retailer must make a corresponding price modification in its pricing database, whether such database is stored at the local level or at the home office database. These many variables surrounding re-pricing comprise hidden costs to a retailer, and were, prior to this invention, understood as a cost of doing business. It is therefore an object of the invention to implement a system of tracking retail goods in a way that minimizes the existence of human error occurring in connection with pricing and re-pricing not only in connection with a specific item or floor display but also in connection with a larger pricing strategy as tied to a central database.

Other serious problems in the supply chain may include routine misplacement of a given product in connection with shipping; mishandling or improper storage of product; and human error due to improperly shelving or labeling the product. It is further an object of the invention to have a tracking system in place that permits an item to be marked or identified early in the supply chain to minimize corruption to the product and data associated with the marked item from events such as shipping and freight damage, misplacement of product due to shipping, improper storage conditions, human error due to improper shelving or price labeling, and to allow retailers to identify the status, condition, and location of the identified item without substantial human interaction. That is, the invention has a goal of minimizing or eliminating human error in connection with the entire supply chain, if desired.

U.S. Pat. No. 6,089,453 (the "'453 patent"), issued to Kayser et al, discloses an electronic shelf price tag capable of changing price in response to an external signal. The '453 patent suffers from several notable deficiencies. For instance, in order to obtain inductive power the shelf price tags must be wired into the shelves, and as such the shelf price tags are not capable of being applied to items capable of moving throughout a retail location, such as products or devices associated with people like employee identification badges. Further, in order to update prices on the shelf price tag, human involvement is required insofar as a handheld scanner must be used to read a barcode and upload the appropriate information to the shelf price tag. Finally, the shelf price tags are not capable of interacting with nearby products themselves; rather, the shelf price tags are only capable of interacting with a human-controlled interface. It is an object of the invention to provide an automatically updatable shelf tag capable of being easily moved in a retail location that can interact with other products, assets, and devices in the tag's proximity.

U.S. Pat. No. 4,973,952 (the "'952 patent") and U.S. Pat. No. 5,995,015 (the "'015 patent"), issued to Malec et al and DeTemple et al, respectively, disclose systems for displaying information at various points in a retail location. The '952 patent utilizes signals placed at predetermined locations throughout a retail facility to display predetermined messages on a display mounted to a shopping cart. The most notable drawback to the '952 and '015 patents is that the location of the trigger signal, the products nearby the signal, and the message to be displayed by the shopping cart must be pre-programmed into the shopping cart's memory by a person. Likewise, the '952 and '015 patents require advance knowledge of the proximity between programmable shelf tags and the products with which the shelf tags are associated so that a human may manually update the programmable shelf tags. It is an object of the invention to automate the association between products and nearby displays so that no knowledge of the proximity of products and displays is required to update prices for the products on the nearby displays.

U.S. Pat. No. 6,313,745 (the "'745 patent"), issued to Suzuki, discloses a recommendation system for a retail location fitting room. A tag is affixed to a piece of clothing, and an in-store terminal reads the tag. The terminal analyzes each product and displays recommendations for the customer based upon the items in the fitting room and upon the customer's purchasing and/or fitting history, if any. The '745 patent is deficient because the product tags are incapable of communicating with anything except the terminal, and thus the product tags only store information about themselves and not associations with other products, assets, or devices. Because the tags cannot process or store information in real time and only provide pre-programmed data, the terminal may recommend products that the customer already browsed but ultimately rejected. That is, because the tag cannot store information about where a customer browsed, the terminal may erroneously recommend products from a location that the customer already visited. It is thus an object of the invention to provide a system in which products store information in real time about their surroundings, including other products and locations, so that a complete picture of a customer's shopping experience may be captured and analyzed.

The invention meets the above objects by providing a real-time, peer-to-peer, horizontal communication framework in which products, assets, and devices communicate with one another to provide detailed, item-level information about location, movement, price, and other retail logistics metrics.

BRIEF SUMMARY OF THE INVENTION

The invention solves the above problems of the prior art by providing a system for tracking, identifying, and pricing products, assets, and devices throughout the retail supply chain. Wireless communication tags are affixed to products, assets, and devices. The tags wirelessly communicate with one another and perform associations of information between tags. The tags also communicate with an application server via a wireless communication infrastructure. Legacy systems provide information to the application server about products, assets, and devices for various tasks, including tag initialization. Actions are performed as a result of the associations of information between tags.

The tag includes a wireless communications device, which has a wireless antenna, a transceiver, a processor, and memory. The tag may also have a casing, a display, and a backplane for communication between components of the tag. If included, the display has a control sequencer, a display driver, and a display medium. The tag may also include sensors that provide information to the tag about the environment in which the product, asset, or device is located. The tag may be powered with an onboard power source, or the tag may be powered with ambient power such as solar or inductive power.

The tags are capable of collecting and storing information about user-defined zones and boundaries, logical address, associations with other tags, physical location, price, physical condition, status, permissions defining actions allowed, actions to be taken, and alarms to be sounded when certain associations take place.

In a retail setting, the tags may be affixed to products using product packaging, shelf labels, store displays, and hanging fobs. The tags may be affixed to assets such as fixtures, baskets, tools, entryways, shelves, hanging racks, pallets, security cameras, loading docks, storerooms, and fitting rooms. The tags may be affixed to devices associated with persons and typically take the form of employee identification badges, customer loyalty cards, and security badges.

The invention provides intelligence to products, assets, and devices such that logistics and inventory control becomes a passive, autonomous data collection activity, rather than an active human activity subject to error. The invention provides instantaneous identification of the location of products, assets, and devices, inventory levels, restocking alerts, loss prevention measures, and many other features heretofore unknown in the logistics industry. These and other advantages provided by the invention will become apparent from the following detailed description which, when viewed in light of the accompanying drawings, disclose the embodiments of the invention.

BRIEF DESCRIPTION OF TIE DRAWINGS

LISTING OF COMPONENTS

101—tag
103—product
105—asset
107—device
109—application server
111—infrastructure
113—legacy systems
115—zone
117—address
119—associations
121—location
123—price
125—condition
127—status
129—boundary
131—permissions
133—antenna controller
135—routers
137—transceivers
139—antennas
141—rules
143—actions
145—alarm
147—point of sale ("POS") terminals
149—inventory
151—low frequency wireless communications unit
153—low frequency antenna
155—low frequency transceiver
157—processor
159—sensor
161—memory
163—display
165—control sequencer
167—display driver
169—display medium
171—backplane
173—power source
175—onboard power
177—ambient power
179—casing
181—router hardware
183—server hardware
185—database software
187—interface software
189—tracking software
191—report software
193—handheld transceivers
195—shelf labels
197—store displays
199—item packaging
201—hanging fobs
203—fixtures
205—baskets
207—tools
209—entryways
211—shelves
213—hanging racks
215—pallets
217—security cameras
219—loading docks
221—employee identification badges
223—customer loyalty cards
225—security badges
227—storeroom
229—fitting room

DETAILED DESCRIPTION OF THE INVENTION

Figure 1:
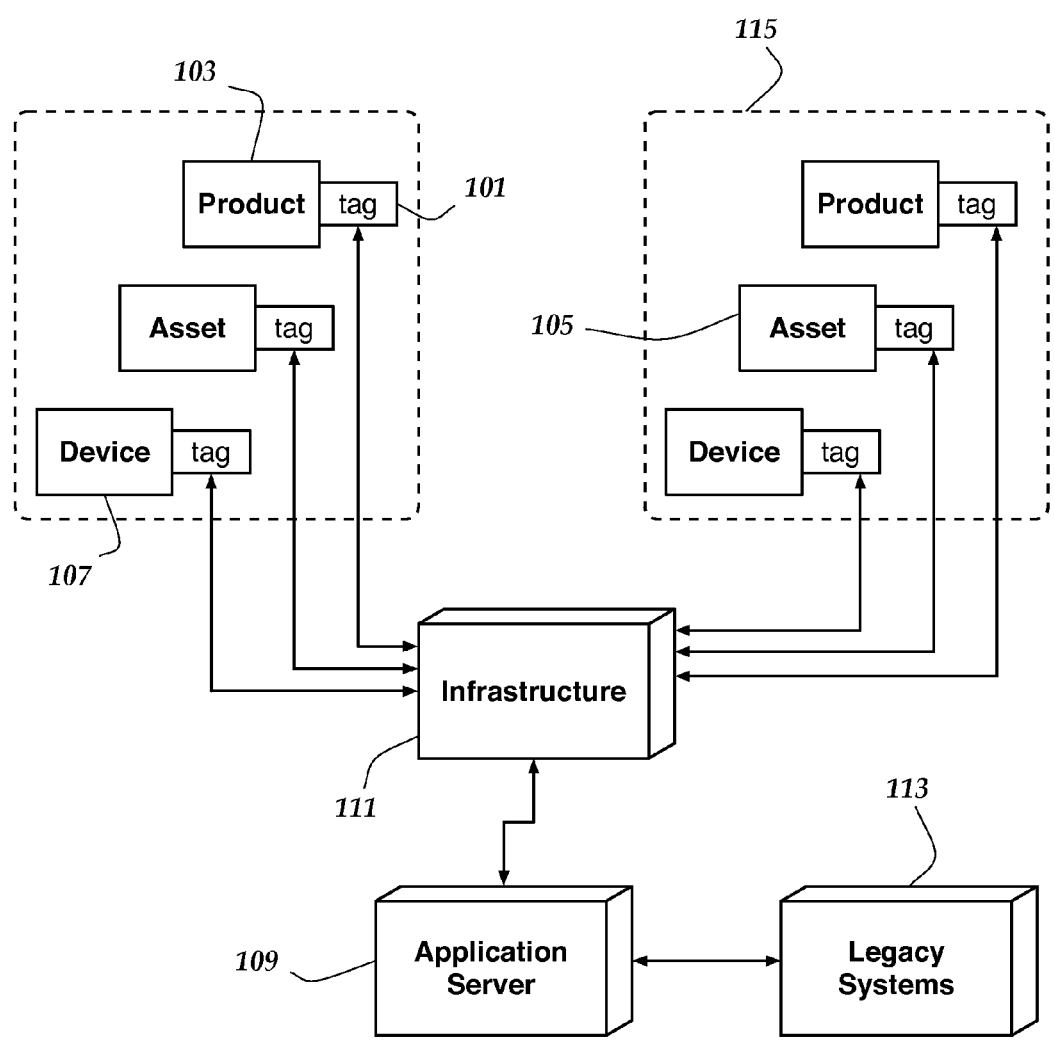
FIG. 1 is a flowchart showing the flow of data between the components of the invention.

The invention comprises a system and method of supply chain management. As seen in FIG. 1, the invention utilizes a two-way wireless electromagnetic communications tag 101 associated with a product 103, asset 105, or device 107. Products 103 are typically fungible goods being moved through a supply chain. Assets 105 are typically fixtures or other items used to facilitate the passage of products 103 through a supply chain. Devices 107 typically track human involvement in a supply chain. Tags 101 send and receive information to and from a application server 109 via an infrastructure 111. Application server 109 may interface with legacy systems 113 in order to obtain information about products 103, assets 105, or devices 107. Products 103, assets 105, and devices 107 are preferentially organized into zones 115.

Application server 109 is preferably one or more general purpose computers comprising a CPU, main storage, I/O resources, with at least one of the general purpose computers further comprising a user interface including a manually operated keyboard and mouse. Even more preferably, application server 109 is one or more general purpose computers running Linux operating system software with sufficient CPU, main storage, I/O, error-correcting, and database resources to handle at least one hundred database transactions per second.

Figure 2:
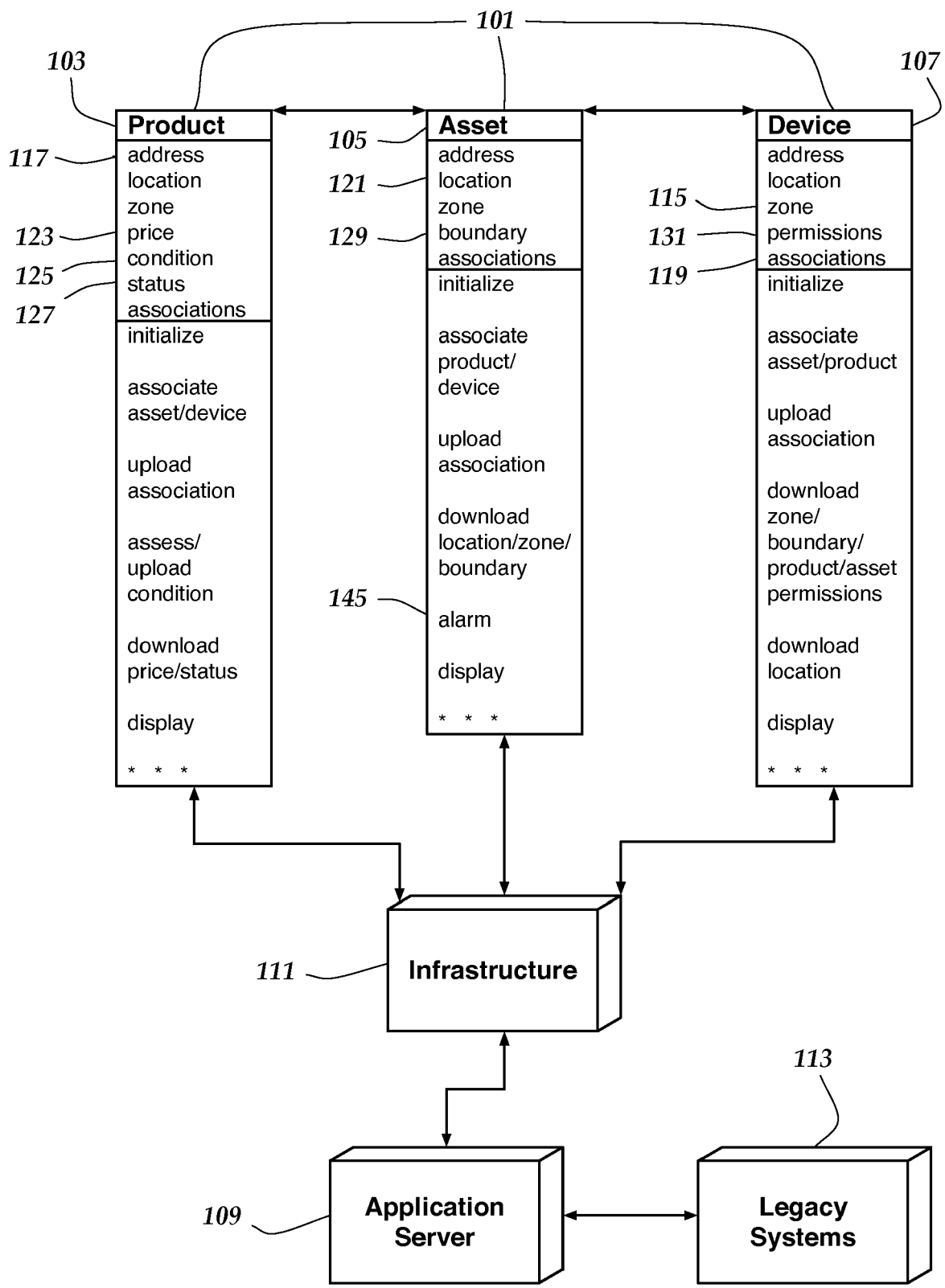
FIG. 2 is a flowchart showing the data fields and operations for products, assets, and devices within the general flow of data between the components of the invention.

Turning now to FIG. 2, each tag 101 is assigned a unique address 117 capable of identifying an individual tag 101. Products 103, assets 105, and/or devices 107 may form associations 119 with one another via wireless communication between tags 101. Associations 119 formed between products 103, assets 105, and/or devices 107 are uploaded to application server 109, which processes and issues instructions based upon associations 119.

The content stored, sent, or received by tag 101 is determined by whether tag 101 is associated with product 103, asset 105, or device 107. Product 103 may have fields for address 117, associations 119, location 121, zone 115, price 123, condition 125, and status 127. In addition to fields for address 117, associations 119, location 121, zone 115, asset 105 may also have a field for boundary 129 and device 107 may have a field for permissions 131.

When products 103, assets 105, and/or devices 107 form associations 119 with one another, associations 119 may be digitally stored on each tag 101 as a timestamp combined with address 117 of associated tag 101. Associations 119 may also result in the transfer of other information between tags 101. For instance, assets 105 typically have a known location 121; therefore, when a product 103 or device 107 associates with an asset 105, the location 121 of product 103 or device 107 may be overwritten to reflect that location 121 of product 103 or device 107 is equal to location 121 of asset 105. Likewise, an asset 105 may form boundary 129 of zone 115; if product 103 or device 107 crosses boundary 129, zone 115 of such product 103 or device 107 may be overwritten to reflect the current zone of product 103 or device 107.

Location 121 may refer to the physical location of tag 101, which may be represented by GPS coordinates for tags 101 in transit, xyz coordinates of a physical location within a retail establishment, or a retailer-specific designation of shelf space locations within a retail establishment. Zone 115 may be a physically defined space bounded by assets 105 at locations 121 to form boundaries 129, or zone 115 may be a logically defined space.

Price 123, condition 125, and status 127 are fields typically associated with product 103. Price 123 and status 127 may be updated by application server 109. Condition 125 may be a self-assessed value that provides information about the state of a product 103, including whether product 103 has been damaged, mishandled, or misplaced. Status 127 may be a value that reflects whether product 103 has been sold, dispensed, depleted, or other information relating to the station of product 103 within a supply chain.

Boundary 129 is a field typically associated with asset 105. Boundary 129 defines whether asset 105 is at the junction of two or more zones 115. Typically, zones 115 are defined such that application server 109 issues instructions when zone 115 changes or boundary 129 is crossed by product 103 or device 107.

Permissions 131 is a field typically associated with device 107. Permissions 131 defines whether device 107 may take a specified action with respect to a product 103 or asset 105.

Figure 3:
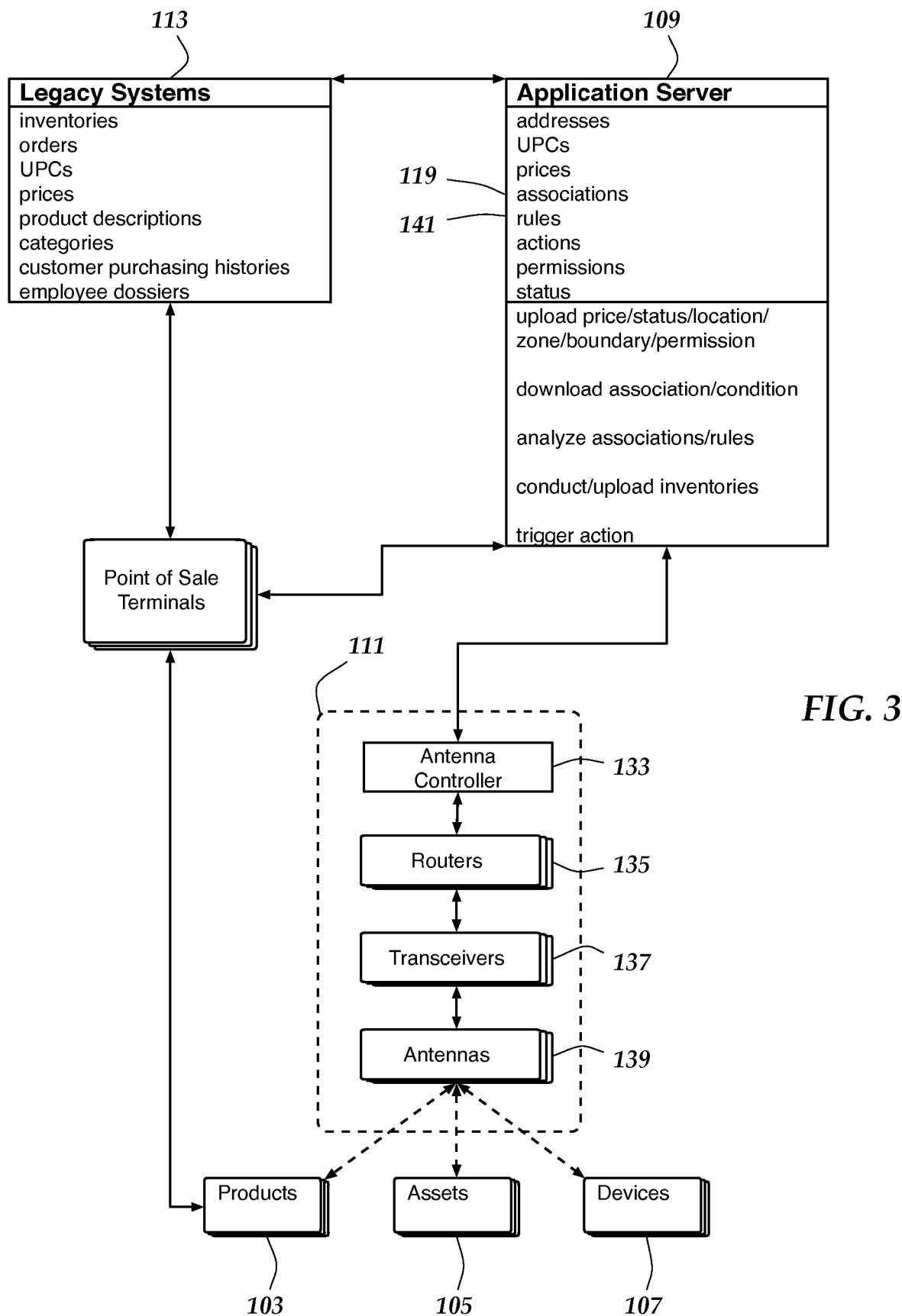
FIG. 3 is a flowchart showing the data fields, operations, and components of an application sever, legacy system, and infrastructure within the general flow of data between the components of the invention.

The composition of application server 109, infrastructure 111, and legacy systems 113 is shown in more detail in FIG. 3. Infrastructure 111 provides the communications interface between application server 109 and products 103, assets 105, and devices 107. The purpose of infrastructure 111 is to quickly and efficiently route wireless communications traffic from application server 109 to the appropriate tag 101 associated with product 103, asset 105, or device 107. Infrastructure 111 may comprise an antenna controller 133, one or more routers 135, one or more transceivers 137, and/or one or more antennas 139 as may be necessary due to the size and complexity of a given supply chain. For smaller applications, a wireless router 135 may serve the function of infrastructure 111. Infrastructure 111 may also comprise standard IP networking components known and used in the information technology industry.

Figure 3A:
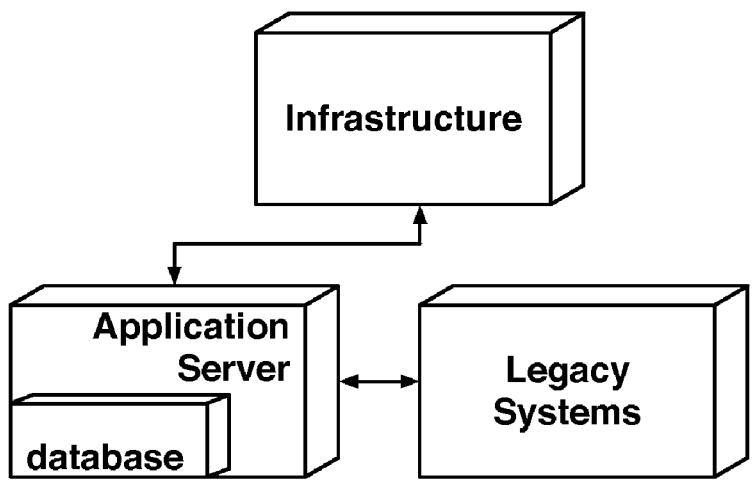
FIGS. 3a and 3b are flowcharts showing alternate configurations of the application server.
Figure 3B:
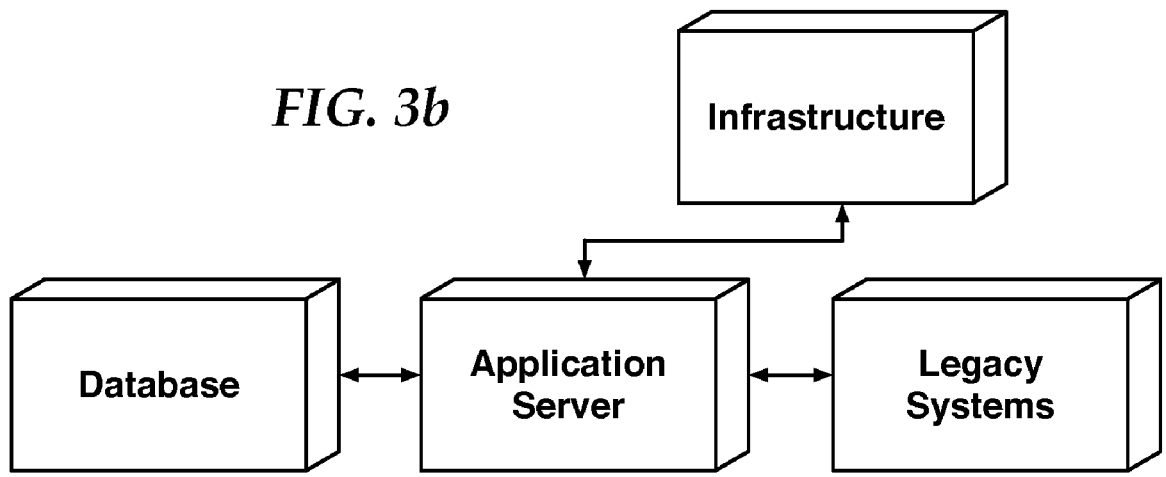

Application server 109 comprises a repository for information about products 103, assets 105, and devices 107. Application server 109 may be a single system hosting both data and application software (as shown in FIG. 3a), or application server 109 may comprise separate systems to serve data and application functions (as shown in FIG. 3b). Application server 109 may contain a copy of data existing on each tag 101 that exists in a supply chain. Furthermore, application server 109 may contain historical information as existing on tags 101 in the past. For example, application server 109 may contain location 121 existing on tag 101 associated with product 103 over a period of time as product 103 moves through various locations 121. Location 121 on tag 101 would change, and application server 109 would receive and store such changes in real time.

In addition to containing current and historical information contained on tags 101, application server 109 comprises other information about how to analyze and control the movement and of and relationship between products 103, devices 107, and to a lesser extent assets 105. Application server 109 may contain a software engine that processes multiple rules 141 that dictate when and how a product 103 may move in and leave the supply chain. For example, rule 141 may state that a product 103 may only cross a boundary 129 only if status 127 indicates that payment has been received for product 103. Application server 109 may also contain actions 143 that occur upon a triggering by one or more rules 141. To continue the above example about a rule 141 against crossing boundary 129, if product 103 does cross boundary 129, action 143 may produce an audible alarm at asset 105 that defines boundary 129. Likewise, action 143 may produce a report to a supervisor if product 103 is dispensed or transported without an accompanying transaction to account for such dispensation or transported. Actions 143, particularly those related to time sensitive occurrences such as attempted theft (whether by larceny or by inventory shrinkage), may optionally be stored and triggered on assets 105 (see FIG. 1 for action 143 consisting of an alarm 145).

In addition to collecting data about tags 101, another important function of application server 109 is to interface with one or more point of sale ("POS") terminals 147. POS terminals 147 collect product, payment, and customer information relating to products 103 and deliver such information not only to application server 109, but also to legacy systems 113. POS terminals 147 may modify specific fields found within tags 101 associated with products 103, including location 121, zone 115, and status 127.

Application server 109 also serves to interface with legacy systems 113 within a supply chain. Virtually all supply chains have multiple systems for ordering, inventory control, employee dossiers, and other information necessary to the operation of a supply chain. Application server 109 may query and update legacy systems 113 in order to maintain continuity of data between application server 109 and legacy systems 113. As one example, application server 109 may perform an inventory 149 by counting predetermined products 103 in a predetermined location 121. Such inventory 149 may be compared with sales information from POS terminals 147 and expected inventory 149 levels from legacy systems 113 to determine whether the expected number of items are indeed in location 121.

Figure 4:
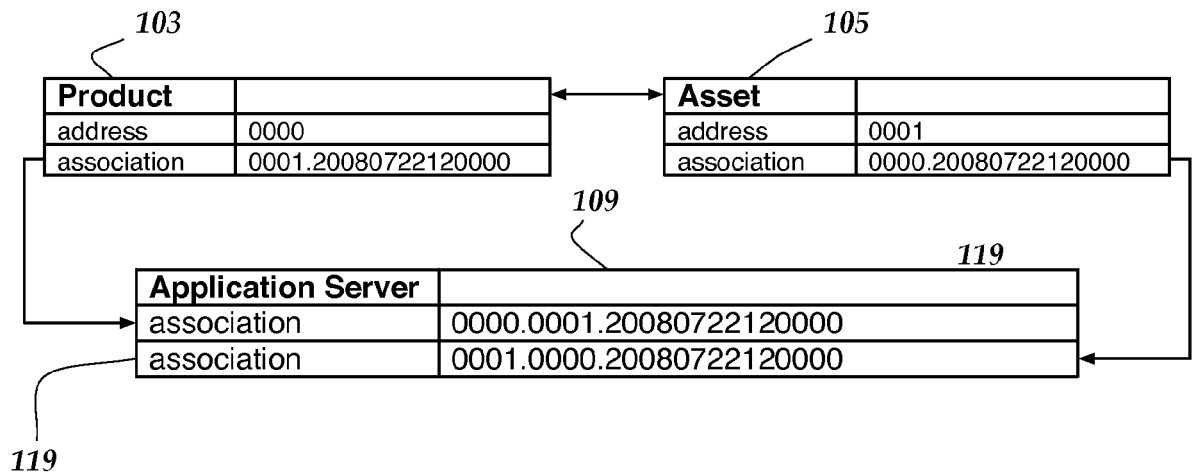
FIG. 4 is flowchart showing the details of an association occurring between a tag-enabled product and asset.

As shown in FIG. 4, for every association 119 between two or more tags 101, each tag 101 involved in such association 119 forwards information relating to the association to application server 109. For instance, if the physical manifestation of association 119 between two tags 101 is a digitized timestamp coupled with addresses 117 of two associated tags 101, then application server 109 will receive two reciprocal copies of association 119. The reciprocal copies of association 119 serve as a confirmation that association 119 was indeed made between two tags 101, and may also serve to confirm that changes made to fields of tag 101 associated product 103 were made as a result of association 119 between product 103 and asset 105.

Figure 5:
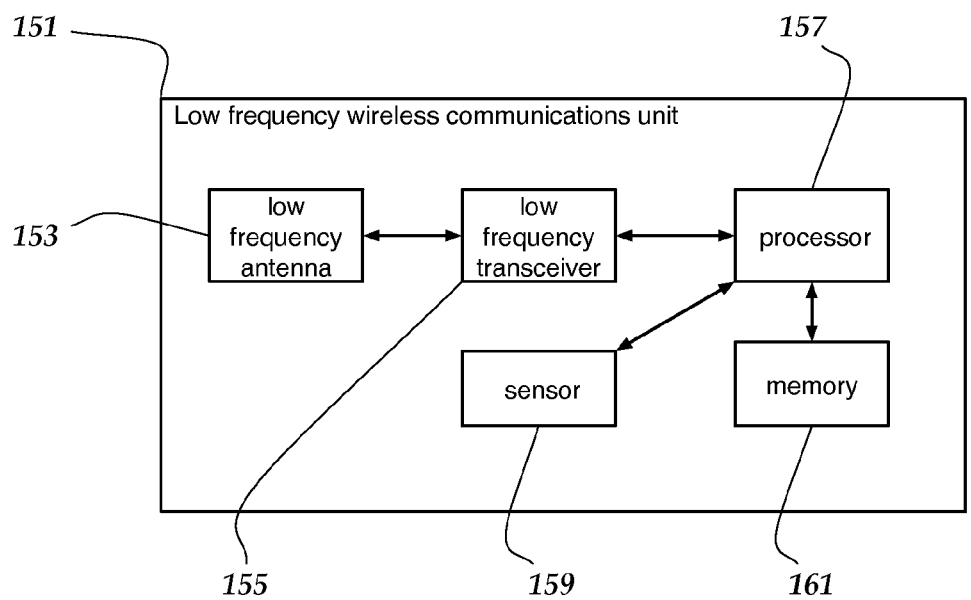
FIG. 5 is a schematic view of the low frequency wireless communications unit utilized in the invention.

In the best mode known to the inventors, and as seen in FIG. 5, tag 101 comprises a low frequency wireless communications unit 151. Low frequency wireless communications unit 151 is preferably IEEE P1902.1 compliant, although other inductive communications devices capable of serving as data transceivers rather than mere reflective transponders are desirable as well.

Low frequency wireless communications unit 151 is comprised of a low frequency antenna 153, a low frequency transceiver 155, a processor 157, one or more sensors 159, and memory 161. Low frequency wireless communications unit 151 is a functional unit that sends and receives wireless communications and processes the data transmitted or to be transmitted in such communications. Low frequency antenna 153 sends and receives the physical electromagnetic signals that comprise the wireless communications. Low frequency transceiver 155 is a device that (1) processes the physical signals received by low frequency antenna 153 into digital signals and (2) translates digital signals into radio transmissions.

Processor 157 receives and processes data from low frequency transceiver 155, sensors 159, and memory 161. Processor 157 determines if the signal received by low frequency antenna 153 is directed towards low frequency wireless communications unit 151. Sensors 159 can be any number of off-the-shelf or custom sensors that are designed to gather and transmit data about the physical environment surrounding tag 101. Memory 161 is useful for storing data generated by sensors 159 and other data for which onboard storage is necessary, including zone 115, address 117, associations 119, location 121, price 123, condition 125, status 127, boundary 129, and permissions 131.

Figure 6:
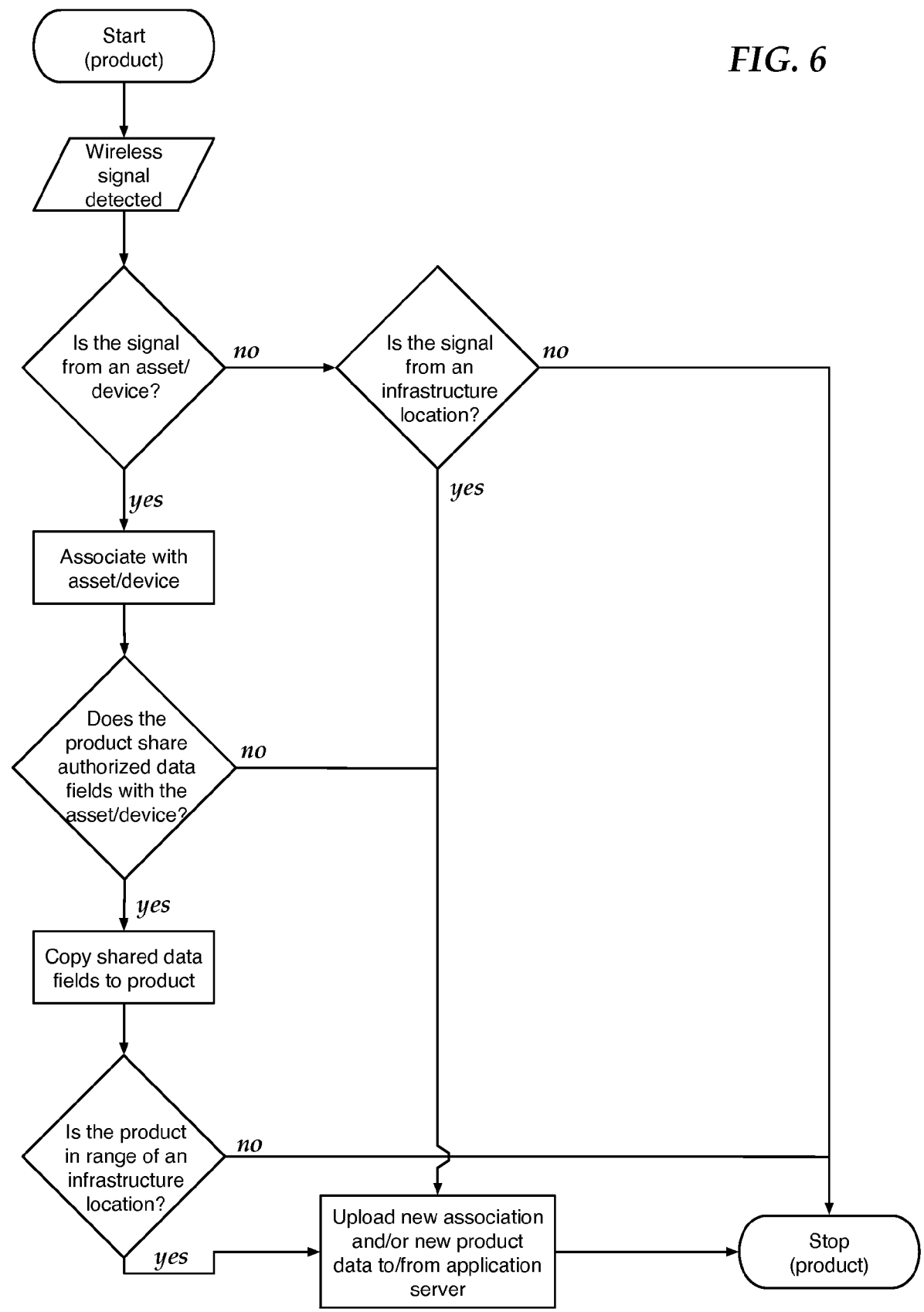
FIG. 6 is a flowchart showing how products, assets, and devices wirelessly associate and transfer data.

FIG. 6 demonstrates the flow control exercised over tag 101 associated with product 103 by processor 157. When a wireless communications signal is detected by low frequency antenna 153, processor 157 determines whether the signal is from a compatible asset 105 or device 107. If the signal is from a compatible asset 105 or device 107, product 103 associates with asset 105 or device 107 and, if authorized, copies data from data fields on both product 103 and asset 105 or device 107. If product 103 is within range of infrastructure 111, the association between product 103 and asset 105 or device 107 and new data on product 103 are uploaded to application server 109. If the signal is not from a compatible asset 105 or device 107, processor 157 next determines whether the signal is directed specifically to tag 101 from infrastructure 111 and if so, uploads new association and data (if any) from product 103 to application server 109. Depending on the type of data transfer, application server 109 may in turn transfer such association and new data to legacy systems 113. If the signal is not from a compatible asset 105 or device 107 or infrastructure 111, processor 157 sleeps to conserve power until the next wireless communications signal is received. Similar flow control processes are used to control assets 105 and devices 107, although assets 105 and devices 107 generally receive new data from infrastructure 111 instead of product 103.

As demonstrated by FIG. 6, data residing on tag 101 is preferably stored on tag 101 and also on application server 109. Local storage on tags 101 allows the data residing on tags 101 to be read via transceiver 137 of a handheld variety without requiring a query to application server 109. Thus, the data redundancy reduces the load on the overall system architecture.

Figure 7:
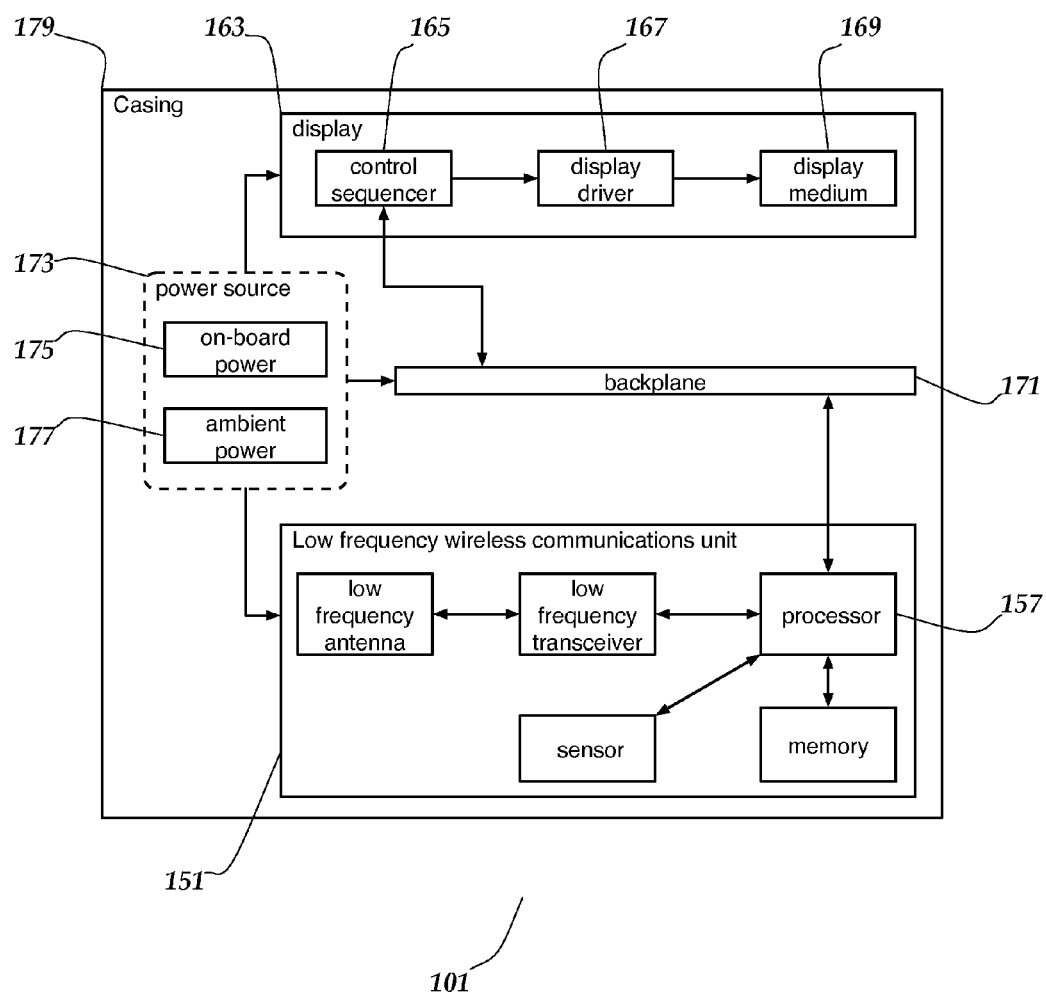
FIG. 7 is a schematic view of the tag utilized in the invention.

In addition to low frequency wireless communications unit 151, tag 101 may also comprise a display 163 as shown in FIG. 7. The display 163 comprises a control sequencer 165, a display driver 167, and a display medium 169.

Control sequencer 165 is a component of display 163 that translates data received from low frequency wireless communications unit 151 into a format readable by display driver 167. Display driver 167 is a component of display 163 that accepts data from control sequencer 165 and translates such data into a format display medium 169 can display. Display medium 169 is capable of accepting and visually displaying data and also of changing the displayed data when new data input is received. Depending on the application for tag 101, display medium 169 may be a display medium such as a liquid crystal display that requires constant power, or display medium 169 may be a display medium such as a bi-stable paper with protective film that displays data for indefinite periods with only intermittent power required to change the data being displayed.

A backplane 171 provides a data transfer bus between low frequency wireless communications unit 151 and display 163 or other optional components of tag 101. Processor 157 serves as the interface between low frequency wireless communications unit 151 and backplane 171. Control sequencer 165 serves as the interface between display 163 and backplane 171.

As seen in FIG. 7, a power source 173 is a required component of tag 101 that provides power to the components of tag 101 either through onboard power 175 or ambient power 177. Onboard power may comprise a battery or a connection to the local power grid which is mounted to tag 101 and is capable of providing the current required to power display 163 and/or low frequency wireless communications unit 151. Ambient power 177 is a remote power source used to power display 163 and/or low frequency wireless communications unit 151, such as an inductive power antenna, solar panel, or other non-wired remote power source. Preferably, ambient power 177 induces current in display 163 and/or low frequency wireless communications unit 151. The use of both onboard power 175 and ambient power 177 may be desirable in that the use of ambient power 177 to provide current to display 163 and/or low frequency wireless communications unit 151 may reduce the current drain on onboard power 175.

While tags 101 associated with assets 105 and devices 107 may be powered with ambient power, tags 101 associated with assets 105 and devices 107 are preferably powered via onboard power 175, such as a battery. Tags 101 associated with products 103 are preferably powered with ambient power 177 or a combination of onboard power 175 and ambient power 177.

A casing 179 is preferably utilized to protect tag 101 from environmental conditions. Depending upon the components utilized for a particular tag 101, casing 179 may need to encase display 163, backplane 171, low frequency wireless communications unit 151, and power source 173.

Whether powered with onboard power 175, ambient power 177, or a combination of both, tags 101 require power management to strike an appropriate balance between functionality and power usage. Where assets 105 are powered with onboard power 175 via a connection to a local power grid, assets 105 are within range of products 103, and products 103 are powered with ambient power 177, little power management is needed because asset 105 can supply all power needed by products 103. Of course, power management may still be desirable to lower energy costs.

Power management becomes reasonably necessary when onboard power 175 of the battery type is utilized; as batteries have a finite charge and thus a finite lifespan, maximization of battery life is crucial. One method of power management is to ignore repeated, consecutive requests from the same tag 101. For example, if a product 103 has associated with the same asset 105 multiple times in a row without associating with another asset 105 or device 107, then such product is stationary with respect to the asset 105. Thus, the zone 115 and location 121 of product 103 are known to application server 109, and new updates would only be duplicative. Therefore, tag 101 associated with product 103 will ignore multiple, consecutive requests to associate with a specific asset 105. Thus enabled, power management also reduces the storage space needed to record associations between products 103, assets 105, and devices 107.

For battery-powered tags 101, sensors 159 preferably include a battery power sensor 159 to notify employees when batteries need to be changed in tags 101. Because the invention provides item-level identification of tag 101 and the associated product 103, asset 105, or device 107, employees can pinpoint which tag 101 needs a battery replacement.

Figure 8:
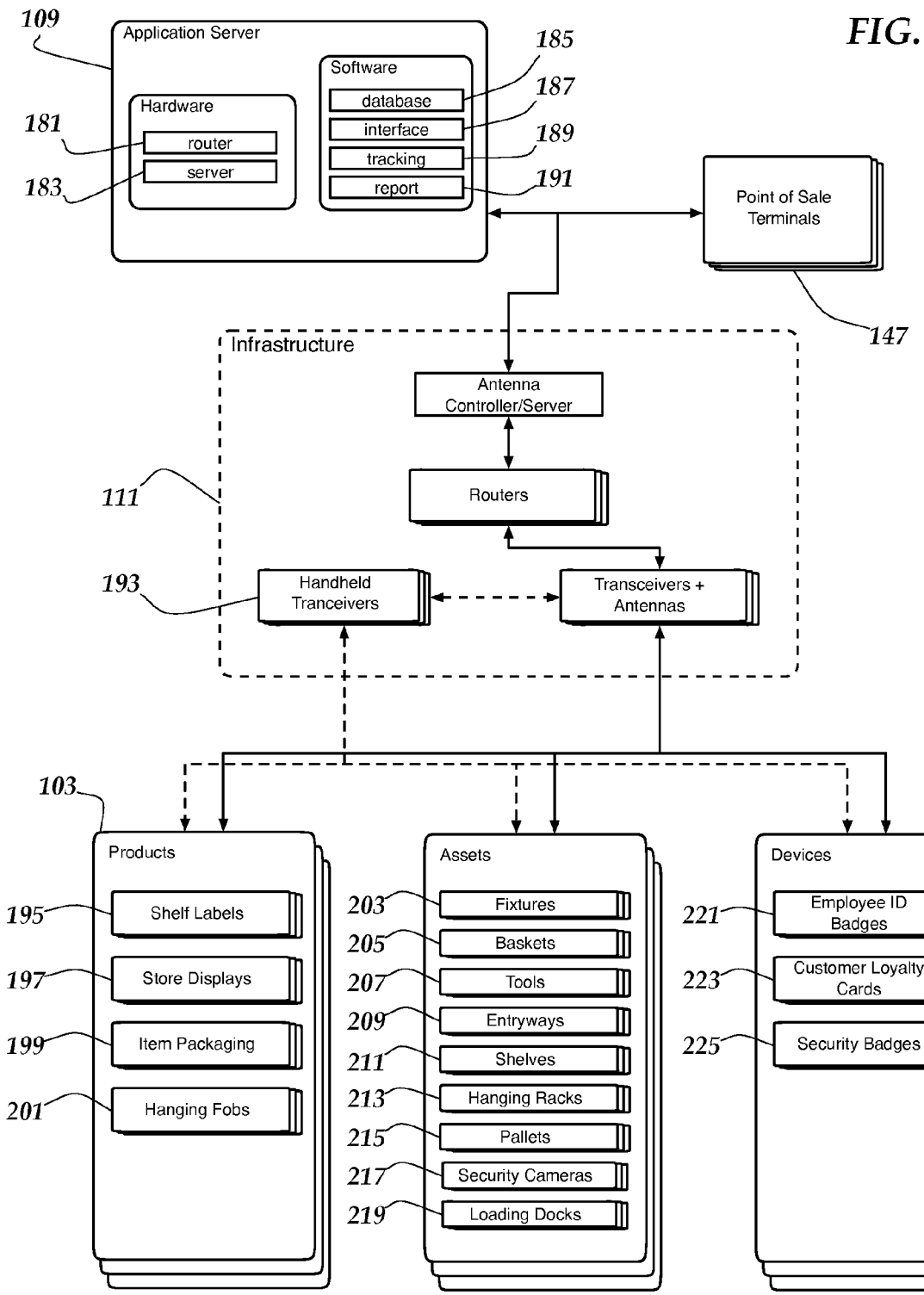
FIG. 8 is a flowchart showing the flow of data between the components of the invention as used in a retail store embodiment.

The preferred embodiment is used in connection with supply chain management pertaining to retail stores. As depicted in FIG. 8, a retail store has application server 109 comprising router hardware 181, server hardware 183, database software 185, interface software 187, tracking software 189, and report software 191. Application servers 109 in individual retail locations may be linked to another centralized application server 109 within a home office for the retail enterprise. As discussed above, application server 109 communicates with products 103, assets 105, and devices 107 via infrastructure 111 or POS terminals 147. In addition to transceivers 137, infrastructure 111 may also comprise one or more handheld transceivers 193.

Tags 101 are associated with products 103 by embedding or applying tags 101 to shelf labels 195, store displays 197, item packaging 199, and/or hanging fobs 201. As discussed earlier, each tag 101 has address 117 such that products 103 are identifiable by tracking software 189.

Tags 101 are associated with assets 105 (which comprise items that are more typically hardware or structural in nature) by embedding or applying tags 101 to fixtures 203, baskets 205, tools 207, entryways 209, shelves 211, hanging racks 213, pallets 215, security cameras 217, and loading docks 219.

Tags 101 are associated with devices 107 by embedding or applying tags 101 to employee identification badges 221, customer loyalty cards 223, and security badges 225.

Tags 101 may be applied to products 103, assets 105, or devices 107 by hand, although the preferable method of application is using a machine to embed tag 101 within packaging or within the product 103, asset 105, or device 107. Embedded installation is preferable so that tag 101 cannot be removed by an unscrupulous employee or customer.

Figure 9:
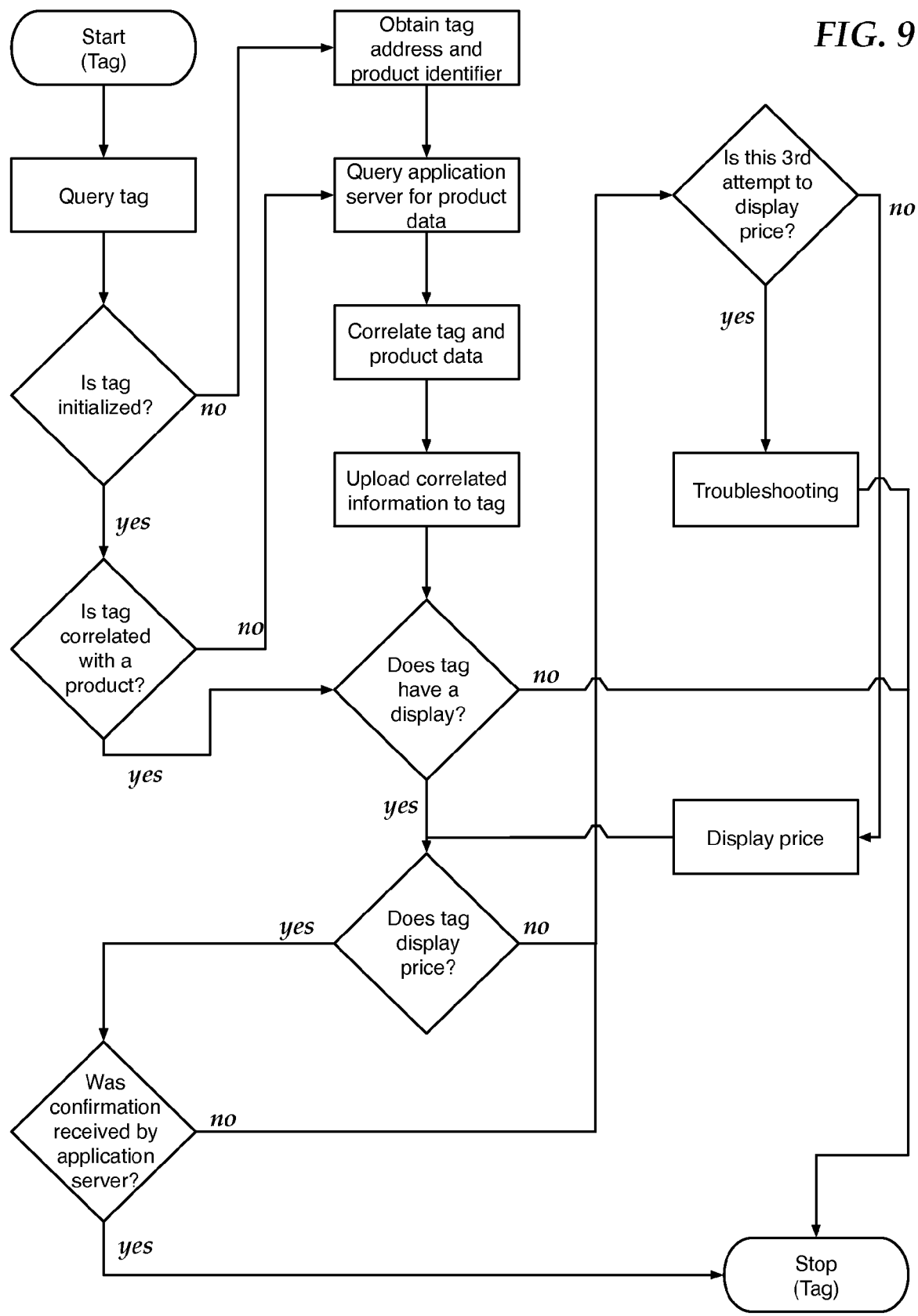
FIG. 9 is a flowchart showing the initialization of a tag.

Before tags 101 may be associated with products 103, assets 105, or devices 107, tags 101 must be initialized. FIG. 9 demonstrates an example of initializing tag 101 associated with product 103, and the process is similar when initializing a tag 101 associated with asset 105 and devices 107. Tag 101 receives a query as to whether tag 101 is initialized. If not, address 117 and an identifier of product 103 with which tag 101 is associated are obtained. Following identification of both individual tag 101 and product 103, application server 109 is queried in order to obtain and upload correlation data for tag 101 and product 103.

Once tag 101 is initialized and correlated with product 103, tag 101 must determine whether it is capable of displaying information, in this example price 123. If tag 101 has display 163, tag 101 instructs display 163 to show price 123 and application server 109 confirms that display 163 properly shows price 123. If price 123 is not properly displayed or confirmation is not received by application server 109, tag 101 attempts to show price 123 another time before application server 109 is notified that troubleshooting steps are necessary.

In the best mode known to the inventors, and again using product 103 as an example while referring to FIGS. 8 and 9, tag 101 associated with product 103 is initialized by sending a low frequency electromagnetic signal from handheld transceiver 193 to uninitialized tag 101. Tag 101 returns a hardware address 117 (preferably a MAC address) to handheld transceiver 193. Handheld transceiver 193 scans a product identifying code (such as an SKU or universal product code, or "UPC") on product 103 and transmits such code and address 117 via low frequency electromagnetic transmission from handheld transceiver 193 to application server 109 via antennas 139, transceivers 137, routers 135, and/or antenna controller 133, depending on the specific configuration. Application server 109 records address 117 of tag 101 and the identifying code associated with product 103. According to the best mode known to the inventors, address 117 represents both a hardware address, preferably a MAC address, and a software address, preferably an IP address and even preferably an IPv6 address, assigned by application server 109. Application server 109 sends via infrastructure 111 to tag 101 such software address 117 and information associated with product 103, including but not limited to zone 115, location 121, price 123, and/or status 127. Tag 101 now has all relevant information needed by display 163 and by tracking software 189 such that tag 101 may be updated directly from the central computer or store computer.

Figure 10:
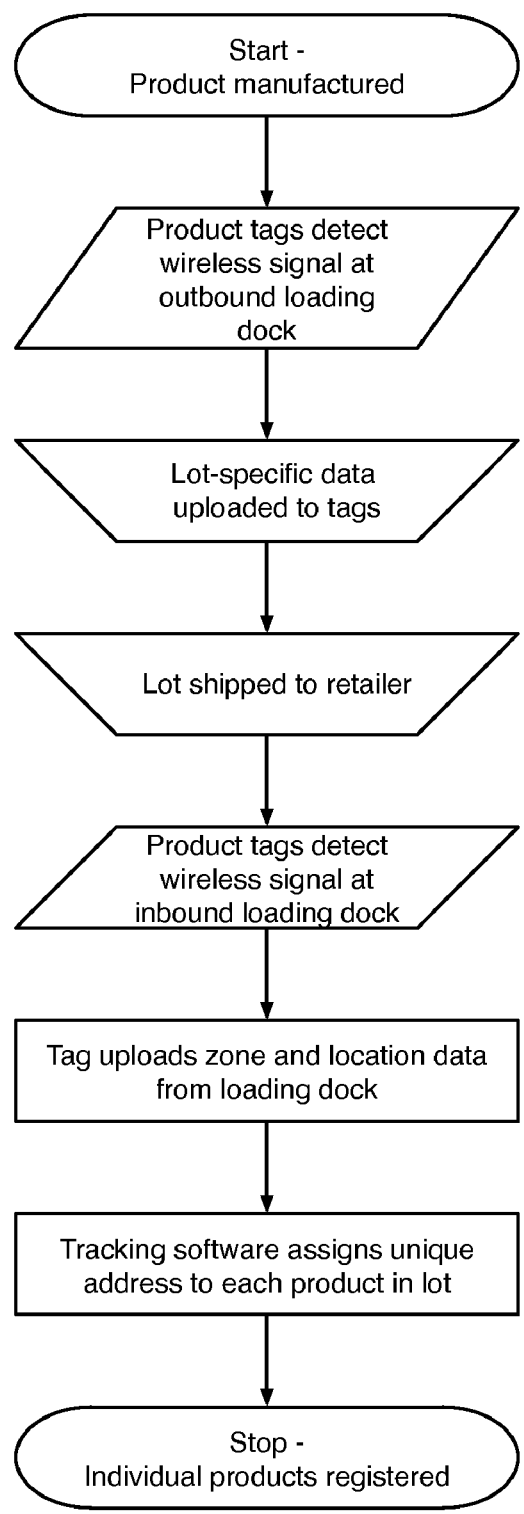
FIG. 10 is a flowchart showing the flow of a tag-enabled product through the supply chain from a manufacturer to a retailer.

The process of entering new products 103 into the system of the invention is shown in FIG. 10. The retailer would preferably require the manufacturer of products 103 to apply item packaging 199 or hanging fob 201 with embedded tag 101 to each product 103. Even more preferably, the manufacturer of products 103 would upload information onto tag 101, including manufacture date, a unique product identifier such as a UPC compatible with the retailer's database software

185, lot number, and other lot-specific information, as each lot of products 103 exited the outbound loading dock of the manufacturing facility.

The preferred entry of information onto tag 101 by the manufacturer allows the retailer to identify shipments of new inventory 149. In situations where the manufacturer applied hanging fob 201 or item packaging 199 having embedded tag 101 to products 103, then inbound loading dock 219 identifies inventory 149 as it arrives at the retail facility due to the movement of products 103 into zone 115. That is, the data fields for zone 115, address 117, and location 121 will be blank as products 103 enter loading dock 219. Because inbound loading dock 219 is an asset 105 that is also equipped with tag 101 that is linked to infrastructure 111, loading dock 219 will be able to supply information to products 103 to fill data fields for zone 115 and location 121, whereas tracking software 189 will supply address 117 to each individual product 103.

Alternatively, the retailer could require an employee to affix hanging fob 201 or item packaging 199 with embedded tag 101 to each product after which information may be supplied to products 103 to fill data fields for zone 115, address 117, and location 121.

The overall system can record not only the event of the delivery of inventory 149 but also the location of the delivery, such as loading dock 219 to which the delivery was made. The ability to locate inventory 149 with precision can be increased dramatically as the retailer integrates assets 105 with tags 101. In this regard, the system will provide location data as products 103 move about the retail facility.

Figure 11:
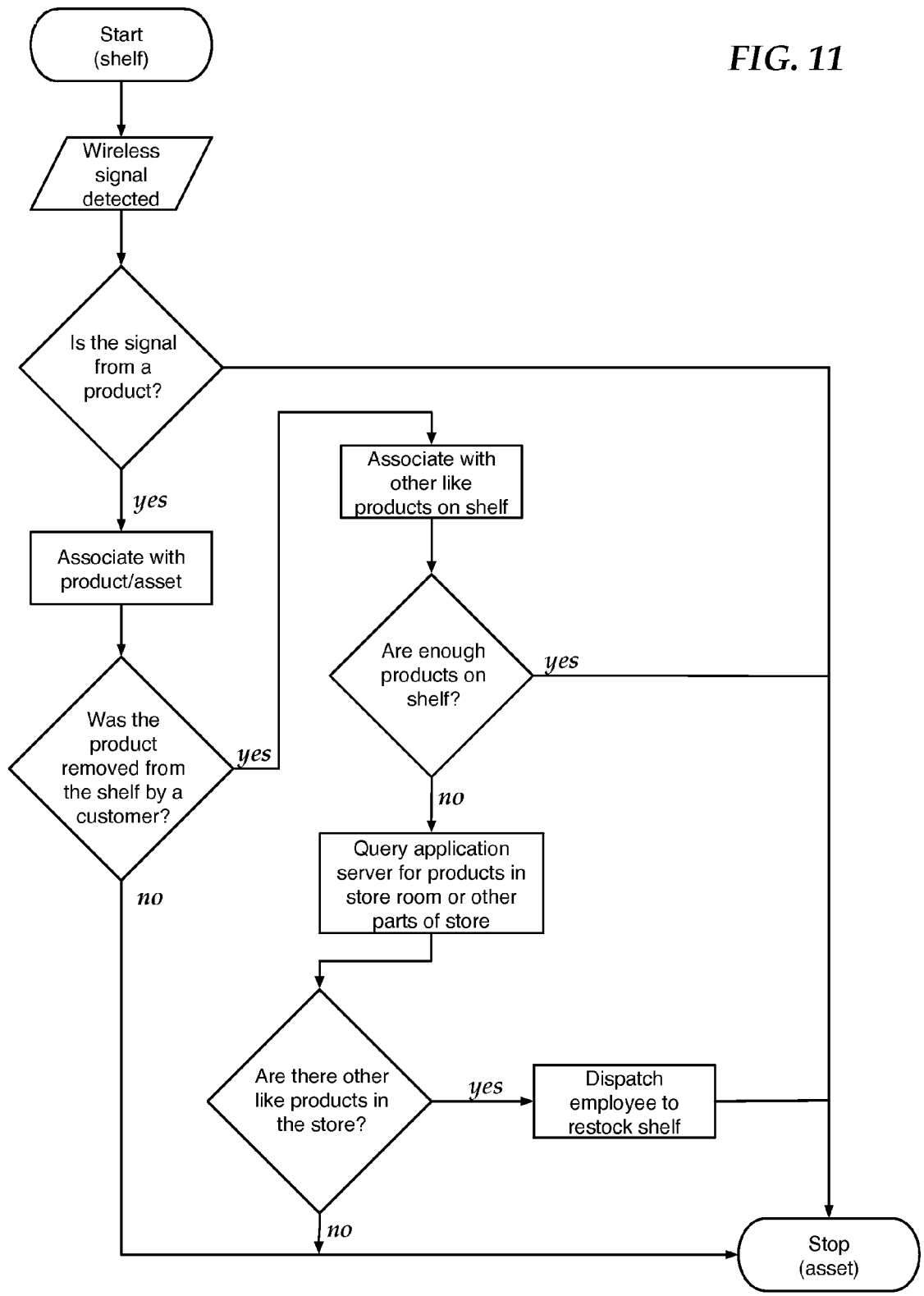
FIG. 11 is a flowchart demonstrating how the invention automatically notifies employees when shelves (or other assets) need to be restocked.

As seen in FIG. 11, in order to establish the framework to be able to identify specific locations on the retail floor, assets 105 such as shelves 211 and hanging racks 213 can be equipped with tags 101 so that tracking software 189 can establish precise locations 121 of products 103 within the retail location. The more assets 105 that are enabled with tags 101, the more precise the location of products 103 may be determined. As one example, shelves 211 can automatically determine when products 103 are being removed from shelves 211. If product 103 has been removed, shelf 211 associates with other like products 103 to determine how many of such products 103 remain on shelf 211. If the number of products 103 on shelf 211 falls below a predetermined level (which will vary depending on the type and popularity of product 103), application server 109 is queried to determine if like products 103 are present somewhere else in the retail facility, whether another location in the store or in a storeroom. If products 103 are in inventory, an employee is dispatched to restock shelf 211.

Along similar lines, product 103 misplaced by a customer will associate with shelf 211 during a routine inventory check. Employees may be dispatched to restock misplaced product 103 on the proper shelf 211.

Figure 12:
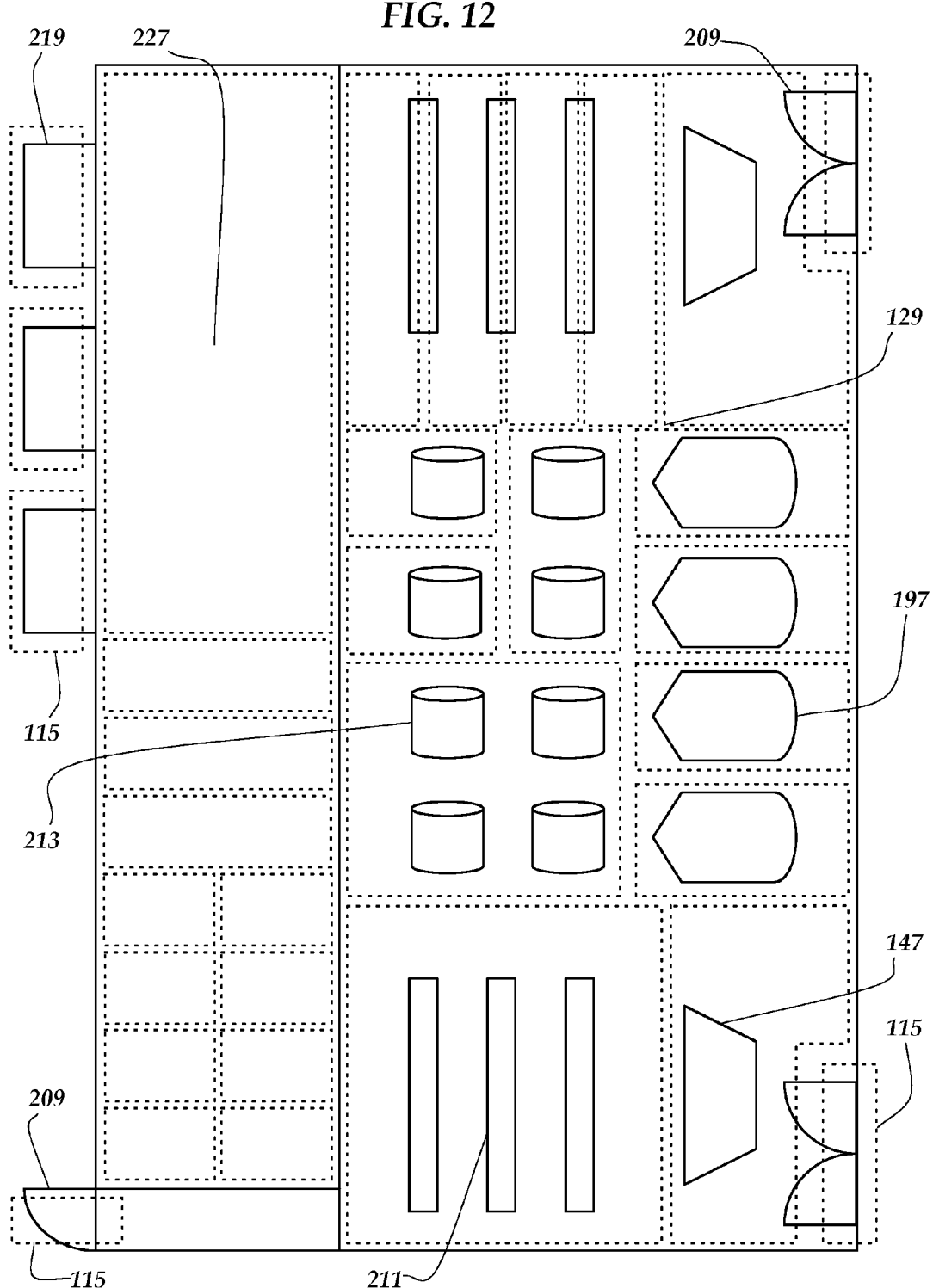
FIG. 12 is a floor plan of a retail store showing an example of the spatial relationship between products, assets, and zones.

As seen in FIG. 12, to establish the parameters in which the system of the invention may operate, the retailer must establish zones 115. Zones 115 are created through the use of transceivers 137 and assets 105, as transceivers 137 provide electromagnetic coverage for the system. In circumstances involving incomplete coverage or inadequate reception, zones 115 will remain incomplete. That is, products 103, assets 105, or devices 107 located beyond zones 115 will not be recorded or identified in the tracking software 189. To define zones 115, a retailer first establishes a connection between application 109 and an antenna controller 133, which thereafter communicates with one or more routers 135 or to control one or more transceivers 137. The transceivers 137 should be advantageously located so as to adequately transmit and receive data in substantially all areas of the retail operation. The goal of this preferred embodiment is to have zones 115 correspond to the entire retail facility and to avoid blackout areas because the data stream from products 103, assets 105, or devices 107 cannot be maintained if there is incomplete communication between all products 103, assets 105, or devices 107 and the array of transceivers 137 within zones 115.

FIG. 12 shows a sample floor plan of a retail facility that is divided into zones 115. Zones 115 may be defined by proximity to individual components of infrastructure 111 or by the presence of assets 105. Three loading docks 219 are shown, each of which are associated with a distinct zone 115 denoted by dashed lines. After being received at loading dock 219, products are transferred to a storeroom 227, which may be preferentially divided into numerous zones to allow for easy location of products 103. The next step in the retail process is to place products 103 onto the retail floor on shelves 211, or hanging racks 213. As shown in FIG. 12, groups of assets 105 may fall within a single zone 115, or a single asset 105 may define a zone 115. Boundaries 129 exist between adjacent zones 115. Each entryway 209 has distinct zone. Such floor plan provides for complete coverage of the retail facility such that blackout areas are avoided.

Figure 13:
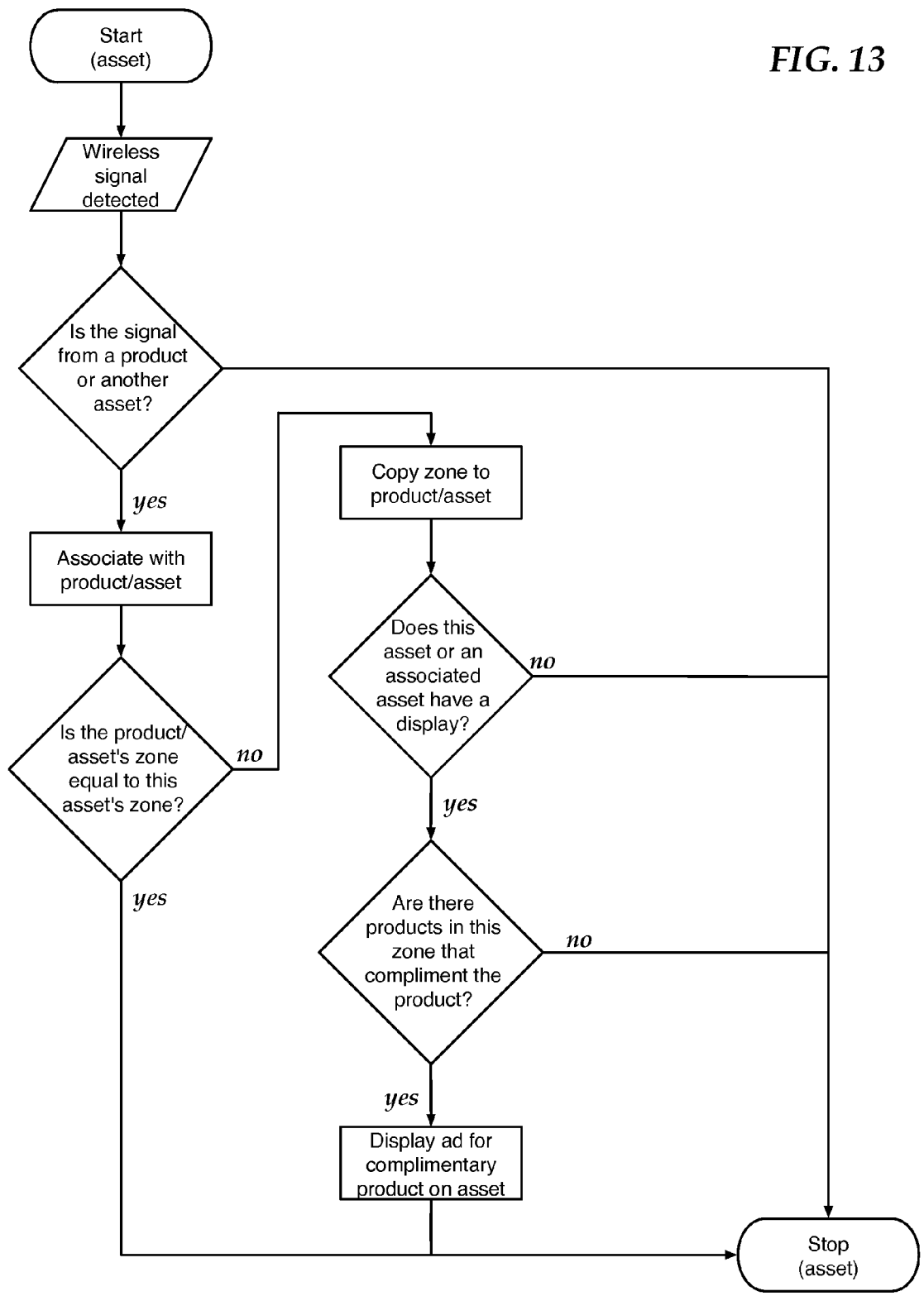
FIG. 13 is a flowchart demonstrating how to display targeted advertising to a customer moving about a retail location.

When products 103 are within zone 115, they are wirelessly linked to centralized application server 109 such that the retailer can, without the need for direct human involvement, monitor not only the location of products 103 within a certain zone 115 but also the relationship between different products 103, assets 105, and devices 107 within such zone 115. As seen in FIG. 13, an asset 105 such as a shelf 211 may detect signals from a product 103 entering a zone 115 in which shelf 211 resides. Such zone 115 is copied to product 103 to record the change in zones; furthermore, if product 103 is currently in a basket 205 equipped with a display 163, basket 205 may display an advertisement for another product 103 within zone 115 complimentary to product 103 within basket 205. Database software 185 may provide retailer-generated data regarding complimentary product 103, such as an advertisement for eggs or flour when chocolate chips are placed into basket 205. Alternatively, database software 185 may provide consumer-specific advertising data regarding complimentary product 103 recorded during a previous purchase of two or more products 103 using a consumer loyalty card 223. Furthermore, database 185 may provide real-time data for display 163 in basket 205 relating to current sales or specials in zone 115. Using the system of the invention, a retailer can preferentially send messages to individual consumers, rather than performing blanket advertising to all customers traveling through a specific location in the store.

The ability to establish the precise location 121 of products 103 will reveal a tremendous amount of information about consumer buying habits. On a real-time basis, tracking software 189 can identify and record the time a customer removed each product 103 from a shelf 211; the path the customer followed through the store location; the time a customer actually purchased products 103; the address 117 associated with each product 103 that was purchased; the cashier who assisted the customer at POS terminal 147; the identifying information of the customer as established in conjunction with a non-cash method of payment or in connection with the use of a consumer loyalty card 223. This information is automatically gathered for each customer, transaction, and product 103.

In situations where a customer does not actually purchase any item, information may still be gathered about the customer's visit. Because customers are generally encouraged to utilize baskets 205, and because location 121 of product 103 can be precisely determined within zone 115, the retailer will be able to capture data about the customer's movements even before when the consumer removes products 103 from shelves 211. Furthermore, for customers who have on their person a consumer loyalty card 223, the retailer will be able to trace the consumer's actual pathway through zones 115. The consumer's ultimate timing of selection of products 103, as well as the precise location 121 of such products 103 on shelves 211, constitute important retail data. Moreover, in those circumstances where the customer has on their person a consumer loyalty card 223, the retailer could have data as to the identity of the person making purchasing decisions and the length of time it took to arrive at those decisions in a given aisle.

As another example of tracking consumer habits without an actual purchase, assets 105 may include a fitting room 229. When purchasing clothing, most customers select several items for a test fit in fitting room 229. When a customer takes several products 103 into fitting room 229, such products 103 associate with fitting room 229. Like all associations, the associations 119 between products 103 and fitting room 229 are uploaded to application server 109. Such associations 119 can be compared with purchase data gathered later from POS terminals 147 to determine which products 103 are more likely to be purchased after a test fit.

To analyze data associated with consumer purchasing habits, report software 191 can query database 185 to provide periodic reports on current inventory 149, consumer volume, consumer spending trends, anticipated demand for inventory 149, and many other questions never before answered with a high degree of confidence in the retail industry. Such reports can also be used to analyze and streamline the flow of customer traffic through a given retail location.

A primary function of the invention is establishing a seamless loss prevention rule 141 for retailers, and the invention is very effective at such goal. Once products 103 are placed for sale on shelves 211 or other assets 105, customers are free to select and remove products 103 from shelves 211 and transport such products 103 throughout in-store zones 115 without restriction. In such configuration, POS terminal 147 serves as an automatic gatekeeper to all products 103, assets 105, and devices 107. Because of the real-time data link between POS terminal 147 and application server 109 (whether located in the retail store or at a home office), the retailer is able to make a near-instantaneous determination regarding the status of products 103 exiting the retail location. Accordingly, a sale made at a POS terminal 147 is reported to application server 109, which simultaneously deducts product 103 from inventory 149 and changes status 127 of product 103 in order to give the customer permission to transport product 103 through the exit doors at entryway 209. POS terminals 147 are key to preventing theft because the entryway 209 is serves as a boundary 129 that prevents unlawful transport of products 103 beyond authorized zones 115. This same system is equally effective at deterring employee theft from loading docks 219 or employee entryways 209. Moreover, since lower-level employees would not have security clearance for interface software 189, such employees could not disable the theft-deterrent system provided by the invention. This is an improvement over the prior art, whereby employees had access to disabling mechanisms for theft deterrent dongles in the ordinary course of their job duties.

Absent confirmation that the transaction has been completed by the tracking software 189, any attempt by a patron or employee to remove products 103 through zone 115 associated with entryway 209 would be construed as an attempted theft, and anti-theft alarms would accurately and properly sound. Further, for situations involving theft, the data associated with other nearby assets 105 could be employed against the thief. That is, application server 109 could make very accurate use of other assets 105 such as security cameras 217. Due to the precise location 121 provided by product 103 and by other assets 105 such as entryway 209 or basket 205, security cameras 217 could be automatically trained upon the thief. Each tag 101 works together to provide a temporal and spatial relationship between the elements of a retail store as never before considered possible before now.

Figure 14:
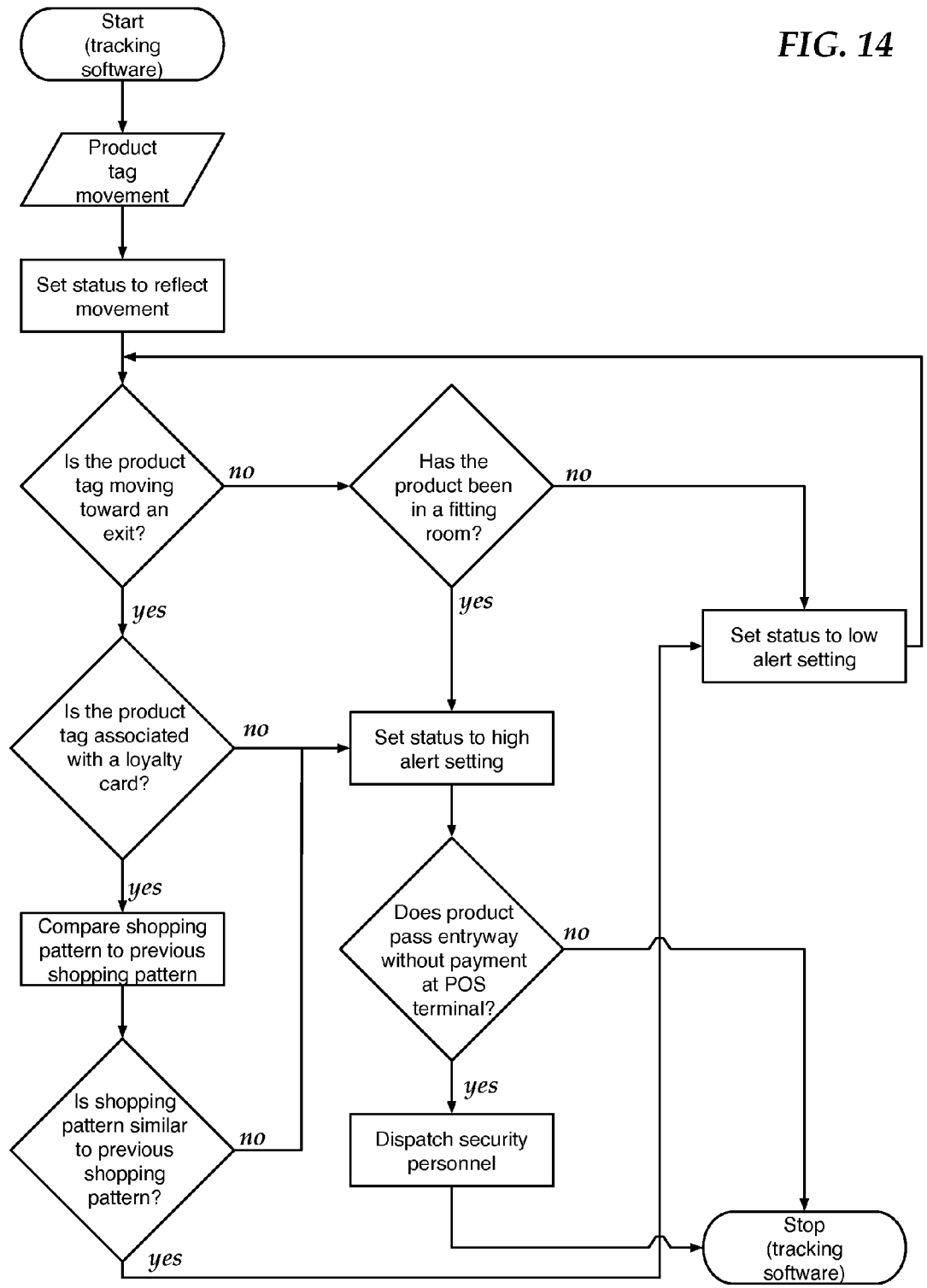
FIG. 14 is a flowchart demonstrating the invention's reaction to the movement of a product through a retail store.

FIG. 14 provides a specific example of a theft deterrence rule 141. Tracking software 189 detects movement of product 103 associated with tag 101 due to association 119 between product 103 and asset 105 or device 107 and sets status 127 to reflect such movement. Tracking software 189 next determines if product 103 is moving towards entryway 209. If not, tracking software 189 sets status 127 to reflect a low alert status unless product 103 has been taken into a fitting room 229 by a customer, in which case tracking software sets status 127 to reflect a high alert status, as most clothing thefts occur when a customer dons stolen clothing underneath regular clothing. If product 103 is moving towards entryway 209, tracking software 189 checks to determine if product 103 is associated with customer loyalty card 223. If not, tracking software 189 sets status 127 to a high alert status, and security personnel may optionally receive an advance alert. If customer loyalty card 223 is associated with product 103, tracking software 189 checks to determine whether the customer's current shopping pattern is similar a previous shopping pattern. If so, status 127 is set at the low alert status. If the shopping pattern is very different from a previous shopping pattern, status 127 is set at the high alert status. Regardless of whether status 127 is a low or high alert, if product 103 crosses boundary 129 at entryway 209 without status 127 changing to reflect a purchase, security personnel are dispatched to apprehend the thief. This example demonstrates that security personnel may be alerted to potential theft well before an alarm sounds so the security personnel may be in place when the thief exits the store, rather than requiring security personnel to pursue the thief in a manner dangerous to other shoppers.

Further still, the invention can provide a rule 141 to differentiate between the failure on the part of the cashier to charge a customer for a product 103 and an attempted theft. Because employees must physically handle each product 103 as it is being purchased, product 103 is able to associate with employee ID badge 221. Such association confirms that any error to charge a customer lies with the employee, not the customer, and thus greatly assists in preventing false and expensive accusations of theft by the retailer. In such situation, basket 205 could instantaneously provide feedback as to the identity, location 121, and price 123 of the unpaid product 103. Preferably, basket 205 notifies POS terminal 147 that an unpaid item is in basket 205 such that POS terminal 147 automatically adds the unpaid product 103 to the customer's invoice.

Another function of the loss-prevention rule 141 is to automatically gather data about damage to or spoilage of products 103 having sensors 159. For example, sensors 159 may comprise a thermocouple to record dangerous temperature fluctuations or meat and dairy products 103. As another example, sensors 159 could comprise an accelerometer design to record drops or falls exceeding the specifications of a particular product 103. As yet another example, sensors 159 could comprise ethylene gas sensors to record spoilage of produce products 103. In situations where product 103 is a perishable food item such as milk, eggs, or produce, tag 101 may be embedded in item packaging 199. Once a product 103 enabled with a sensor 159 enters a zone 115, it can be identified and data from sensor 159 (as stored on memory 161) can be uploaded to application server 109 and analyzed for conformity with adequate shipping requirements. If product 103 has been damaged or has spoiled, application server 109 directs an employee to locate product 103 with handheld transceiver 193 and remove product 103 from circulation.

Yet another function of the loss prevention rule 141 is to confirm authenticity of products 103 throughout the supply chain. When manufacturers apply tags 101 to products 103, the manufacturers may upload confirmation codes to memory 161 of tags 101. Such confirmation codes may confirm that products 103 are genuine rather than counterfeits substituted during earlier steps in the supply chain. If the manufacturer is allowed to introduce to the memory 161 a confirmation code, then the retailer may automatically assess the authenticity of the product immediately upon delivery using tracking software 189.

A primary function of the system of the invention is to provide automated storewide price changes for products 103. In order to establish an initial price 123 of product 103, the retailer would make the business decision to determine the profitability of product 103 given current market circumstances. Such price 123 is entered into database software 185 via interface software 187, which uploads price 123 to individual tags 101 that are associated with each product 103. Due to the real-time data link between POS terminals 147 and application server 109, price changes are made effective for customers checking out at POS terminals 147 as soon as the prices are updated within database software 185 and on products 103. Preferentially, tags 101 associated with products 103 (whether shelf labels 195, store displays 197, item packaging 199, or hanging fobs 201) also comprise display 163; in order to set the price uniformly and without substantial human involvement, display 163 is designed to receive price 123 as stored in database software 185 via transceivers 137 located within the retail location. One benefit in assigning initial price at the specific retail location is to allow the retail store managers greater control over setting prices and watching trends at the local level.

Alternatively, a tag 101 associated with a product 103 having a display 163 may receive price 123 from a centralized home office application server 109, which propagates to application servers 109 in several retail locations or at centralized distribution facilities. Such is the case where a retailer desires to set a standardized price 123 for a particular product 103.

For products 103 that have display capabilities (rather than mere tracking capabilities), including but not limited to shelf labels 195, store displays 197, item packaging 199, or hanging fobs 201, the invention allows a retailer to immediately change prices 123 or other displayed messages for products 103 using centralized application server 109, whether across a single store or across the retailer's entire enterprise. Changes to price 123 can be uploaded to tags 101 immediately, or changes to price 123 can be deferred until a later time, preferably when customer volume is low in the retail location. Safeguards are preferentially designed into database software 185 to ensure updates to price 123 and other data associated with product 103 are proper and legitimate for the circumstances, including but not limited to a protocol built into database software 185 whereby a confirmation message is sent back to the computer that solicited the change to price 123 or other data associated with product 103. Other safeguards may include known computer security methods such as password protection, server authentication, and SSL technology in circumstances where the price change was requested using network communications.

Once product 103 has been purchased at POS terminal 147, tag 101 associated with product 103 is decommissioned; database software 185 notates that product 103 has been sold and has thus exited the retail supply chain. If tag 101 is not embedded within product 103, tag 101 may be removed and reinitialized for later use.

While the inventors have described above what they believe to be the preferred embodiments of the invention, persons having ordinary skill in the art will recognize that other and additional changes may be made in conformance with the spirit of the invention and the inventors intend to Claim all such changes as may fall within the scope of the invention.

We claim:

1. A system for tracking products, assets, and devices in a supply chain, comprising:
    a plurality of tags for storing information and performing wireless communications;
    a product to which a first tag of the plurality of tags is affixed, the first tag comprising:
        a casing;
        a low frequency wireless communications unit comprising (i) a low frequency antenna for receiving wireless communications, (ii) a low frequency transceiver for converting wireless communications to digital signals, (iii) a processor for processing digital signals, and (iv) memory;
        a display comprising (i) a control sequencer for accepting display data from the processor, (ii) a display driver for converting the digital signals received by the control sequencer into a format displayable by a display medium, and (iii) the display medium; and
        a backplane for facilitating digital communication between the low frequency wireless communications unit and the display;
    an asset to which a second tag of the plurality of tags is affixed;
    a device to which a third tag of the plurality of tags is affixed;
    an application server having router hardware, server hardware, database software, and tracking software, the application server being configured for receiving associations created by wireless communications between the first tag, the second tag, and the third tag, wherein the application server is configured for taking actions based on the associations;
    at least one infrastructure node for routing communications between the application server and the first tag, the second tag, and the third tag; and
    at least one legacy system for supplying one or more data items about the product to the application server.

2. The system of claim 1, wherein the first tag further comprises one or more sensors for gathering data about the product associated with the first tag.

3. The system of claim 1, wherein the first tag further comprises an onboard power source.

4. The system of claim 1, wherein the first tag further comprises an ambient power source.

5. The system of claim 1, wherein the information stored on the plurality of tags is selected from the group consisting of zone, address, association, location, price, condition, status, boundary, permissions, rules, actions, and alarm.

6. The system of claim 1, wherein the product is selected from the group consisting of shelf labels, store displays, item packaging, and hanging fobs.

7. The system of claim 1 wherein the data items provided by the legacy systems are selected from the group consisting of inventories, orders, UPCs, SKUs, prices, product descriptions, categories, customer purchasing histories, and employee dossiers.

8. The system of claim 1, wherein the asset is selected from the group consisting of fixtures, baskets, tools, entryways, shelves, hanging racks, pallets, security cameras, loading docks, storerooms, and fitting rooms.

9. The system of claim 1, wherein the device is selected from the group consisting of employee identification badges, customer loyalty cards, and security badges.

10. The system of claim 1 wherein the at least one infrastructure node further comprises one or more components selected from the group consisting of an antenna controller, routers, transceivers, antennas, and handheld transceivers.

11. The system of claim 1 wherein the actions are selected from the group of initializing the tags, decommissioning the tags, changing prices on the tags, taking inventory of the products, restocking the products, locating the products, alerting employees to attempted theft of the products, managing power usage of the tags, advertising targeted to consumers based upon contents of baskets, advertising targeted to consumers based upon prior shopping history, and confirming the authenticity of the products.

12. The system of claim 1, wherein the second tag comprises:
- a second tag casing;
- a second tag low frequency wireless communications unit for receiving wireless communications and converting wireless communications to digital signals;
- a second tag display for displaying a representation of data from the digital signals; and
- a second tag backplane for facilitating digital communication between the second tag low frequency wireless communications unit and the second tag display.

13. The system of claim 12, wherein the third tag comprises:
- a third tag casing;
- a third tag low frequency wireless communications unit for receiving wireless communications and converting wireless communications to digital signals;
- a third tag display for displaying a representation of data from the digital signals; and
- a third tag backplane for facilitating digital communication between the third tag low frequency wireless communications unit and the third tag display.

14. The system of claim 1, wherein the first tag is configured for receiving a correlation of the first tag to an identifier for the product and storing the correlation in the memory.

15. The system of claim 1, wherein the display medium is configured for displaying a price for the product based on price data received wirelessly and converted to the digital signals by the low frequency wireless communications unit.

16. The system of claim 1, wherein the first tag is associated with a hardware address, the first tag being configured for wirelessly communicating the hardware address to the application server.

17. A system for tracking products, assets, and devices in a supply chain, comprising:
- a plurality of tags for storing information and performing wireless communications, wherein a first tag of the plurality of tags further comprises:
  - a casing;
  - a low frequency wireless communications unit comprising (i) a low frequency antenna for receiving wireless communications, (ii) a low frequency transceiver for converting wireless communications to digital signals, (iii) a processor for processing digital signals, and (iv) memory, wherein the information on the first tag is selected from the group consisting of zone, address, association, location, price, condition, status, boundary, permissions, rules, actions, and alarm;
  - a display comprising (i) a control sequencer for accepting display data from the processor, (ii) a display driver for converting the digital signals received by the control sequencer into a format displayable by a display medium, and (iii) the display medium; and
  - a backplane for facilitating digital communication between the low frequency wireless communications unit and the display;
- a product to which the first tag is affixed, wherein the product is selected from the group consisting of shelf labels, store displays, item packaging, and hanging fobs;
- one or more assets to which a second tag of the plurality of tags is affixed, wherein the assets are selected from the group consisting of fixtures, baskets, tools, entryways, shelves, hanging racks, pallets, security cameras, loading docks, storerooms, and fitting rooms;
- one or more devices to which a third tag of the plurality of tags is affixed, wherein the devices are selected from the group consisting of employee identification badges, customer loyalty cards, and security badges;
- one or more application servers having router hardware, server hardware, database software, and tracking software, the application servers being configured for (i) receiving associations created by wireless communications between the first tag, the second tag, and third tag, and (ii) taking one or more actions as a result of the associations, wherein the actions are selected from the group consisting of initializing the tags, decommissioning the tags, changing prices on the tags, taking inventory of the products, restocking the products, locating the products, alerting employees to attempted theft of the products, managing power usage of the tags, advertising targeted to consumers based upon contents of baskets, advertising targeted to consumers based upon prior shopping history, and confirming the authenticity of the products; and
- one or more infrastructure nodes for routing communications between the application servers and the tags affixed to the product, assets, and devices, wherein the infrastructure nodes are further comprised of one or more components selected from the group consisting of an antenna controller, routers, transceivers, antennas, and handheld transceivers;
- one or more legacy systems for supplying one or more data items about the product to the application servers, wherein the data items provided by the legacy systems are selected from the group consisting of inventories, orders, UPCs, SKUs, prices, product descriptions, categories, customer purchasing histories, and employee dossiers.

18. The system of claim 17, wherein the first tag further comprises one or more sensors for gathering data about the product associated with the first tag.

19. The system of claim 17, wherein the first tag further comprises an onboard power source.

20. The system of claim 17, wherein the first tag further comprises an ambient power source.

* * * * *